(12) United States Patent
Mochizuki et al.

(10) Patent No.: US 11,976,798 B2
(45) Date of Patent: May 7, 2024

(54) VEHICLE HEADLIGHT

(71) Applicant: KOITO MANUFACTURING CO., LTD., Tokyo (JP)

(72) Inventors: Kazuma Mochizuki, Shizuoka (JP); Atsushi Sugimoto, Shizuoka (JP); Tomoyuki Ohno, Shizuoka (JP); Takashi Terayama, Shizuoka (JP)

(73) Assignee: KOITO MANUFACTURING CO., LTD., Tokyo (JP)

( * ) Notice: Subject to any disclaimer, the term of this patent is extended or adjusted under 35 U.S.C. 154(b) by 0 days.

(21) Appl. No.: 17/910,176

(22) PCT Filed: Mar. 1, 2021

(86) PCT No.: PCT/JP2021/007658
§ 371 (c)(1),
(2) Date: Sep. 8, 2022

(87) PCT Pub. No.: WO2021/182151
PCT Pub. Date: Sep. 16, 2021

(65) Prior Publication Data
US 2023/0098917 A1    Mar. 30, 2023

(30) Foreign Application Priority Data

Mar. 10, 2020 (JP) ................................ 2020-041324
Mar. 10, 2020 (JP) ................................ 2020-041325

(51) Int. Cl.
*F21S 41/40* (2018.01)
*B60Q 1/12* (2006.01)
(Continued)

(52) U.S. Cl.
CPC ................ *F21S 41/40* (2018.01); *B60Q 1/12* (2013.01); *F21S 41/663* (2018.01); *F21W 2102/155* (2018.01)

(58) Field of Classification Search
CPC .............. B60Q 1/12–124; F21S 41/143; F21S 41/151–153; F21S 41/40;
(Continued)

(56) References Cited

U.S. PATENT DOCUMENTS 9,358,918 B2 *  6/2016  Mochizuki ............ F21S 41/698
9,550,448 B2 *  1/2017  Tanaka .................. F21S 41/255
(Continued)

FOREIGN PATENT DOCUMENTS

CN          1542320 A      11/2004
EP       2 295 291 A1       3/2011
(Continued)

OTHER PUBLICATIONS

International Search Report for PCT/JP2021/007658 dated Apr. 27, 2021.
(Continued)

*Primary Examiner* — Jason M Han
(74) *Attorney, Agent, or Firm* — Sughrue Mion, PLLC

(57) ABSTRACT

A vehicle headlight (1) includes a first lamp unit (10) that includes a light distribution pattern forming unit (12) which forms a predetermined light distribution pattern (P1) according to the light amount of the light emitted from a plurality of light emitting elements (13), and a second lamp unit (20), in which a light distribution pattern (PL) of a low beam is formed by light emitted from the first lamp unit (10) and light emitted from the second lamp unit (20), and in the light distribution pattern (PL) of the low beam, the elbow point (EP) is included in a predetermined region (CA) formed by light including the light from the first lamp unit (10), and a first side region (SA1) and a second side region (SA2) sandwiching the predetermined region (CA) are formed by the light emitted from the second lamp unit (20).

18 Claims, 13 Drawing Sheets

(51) Int. Cl.
*F21S 41/663* (2018.01)
*F21W 102/155* (2018.01)

(58) Field of Classification Search
CPC ..... F21S 41/663–675; F21W 2102/155; F21Y 2115/10
See application file for complete search history.

(56) References Cited

U.S. PATENT DOCUMENTS

| | | |
|---|---|---|
| 2004/0223337 A1 | 11/2004 | Ishida |
| 2008/0253143 A1 | 10/2008 | Blandin et al. |
| 2015/0009694 A1 | 1/2015 | Sekiguchi et al. |
| 2018/0356064 A1* | 12/2018 | Yamamoto ............. F21S 41/43 |
| 2019/0001868 A1 | 1/2019 | Kaino et al. |
| 2020/0049321 A1 | 2/2020 | Ohno |

FOREIGN PATENT DOCUMENTS

| | | |
|---|---|---|
| EP | 2 772 682 A2 | 9/2014 |
| EP | 2 826 667 A1 | 1/2015 |
| EP | 3 608 172 A1 | 2/2020 |
| JP | 2004-327188 A | 11/2004 |
| JP | 2009-009928 A | 1/2009 |
| JP | 2010-040528 A | 2/2010 |
| JP | 2011-063070 A | 3/2011 |
| JP | 2014-165130 A | 9/2014 |
| JP | 2015-013512 A | 1/2015 |
| JP | 2019-010962 A | 1/2019 |
| WO | 2018/186187 A1 | 10/2018 |

OTHER PUBLICATIONS

Communication dated Feb. 21, 2024 in the State Intellectual Property Office of the People's Republic of China in application No. 202180020237.4.

* cited by examiner

VEHICLE HEADLIGHT

This application is a National Stage of International Application No. PCT/JP2021/007658 filed Mar. 1, 2021, claiming priority based on Japanese Patent Application No. 2020-041324 filed Mar. 10, 2020 and Japanese Patent Application No. 2020-041325 filed Mar. 10, 2020.

TECHNICAL FIELD

The present invention relates to a vehicle headlight.

BACKGROUND ART

As a vehicle headlight typified by an automobile headlight, a vehicle headlight including a light emitting unit in which a plurality of light emitting elements are arranged in a matrix and forming a light distribution pattern of a low beam by light emitted from the light emitting unit is known. Patent Literature 1 below describes such a vehicle headlight.

A vehicle headlight described in Patent Literature 1 below includes a light emitting unit in which a plurality of light emitting elements are arranged in a matrix, and a control unit that adjusts a light amount of light emitted from each light emitting element. In this vehicle headlight, a light distribution pattern of a low beam can be formed by adjusting the light amount of light emitted from each light emitting element in the light emitting unit by the control unit.
[Patent Literature 1] WO 2018/186187 A

SUMMARY OF INVENTION

In the vehicle headlight described in Patent Literature 1, since the light amount of light emitted from the light emitting element can be adjusted by the control unit, an intensity distribution of light in the light distribution pattern of the low beam can be adjusted. Since such a vehicle headlight includes a plurality of light emitting elements, manufacturing cost tends to be higher than those of a vehicle headlight in which light emitted from a light source is reflected by a reflector to form a light distribution pattern of a low beam and a vehicle headlight in which light emitted from a light source is partially blocked by a shade to form a light distribution pattern of a low beam. Meanwhile, these vehicle headlights tend not to finely adjust the light intensity distribution in the light distribution pattern of the low beam as compared with the vehicle headlight described in Patent Literature 1. A region including an elbow point in the light distribution pattern of the low beam has a larger change rate of the light intensity than a region on one side and a region on the other side in a left-right direction. Therefore, there is a demand for fine adjustment of the light intensity distribution in the above region.

Therefore, an object of the present invention is to provide a vehicle headlight capable of finely adjusting an intensity distribution of light in a predetermined region including an elbow point in a light distribution pattern of a low beam and reducing a manufacturing cost.

In order to achieve the above object, according to the present invention, there is provided a vehicle headlight including: a first lamp unit that includes a light distribution pattern forming unit in which a plurality of light emitting units capable of individually changing a light amount of light to be emitted is arranged in a matrix and which forms a predetermined light distribution pattern according to the light amount of the light emitted from the plurality of light emitting units; and a second lamp unit that emits light having a specific light distribution pattern, in which a light distribution pattern of a low beam including a horizontal cutoff line extending in a horizontal direction from an elbow point to one side in a left-right direction and an inclined cutoff line extending obliquely upward from the elbow point to the other side in the left-right direction is formed by light emitted from the first lamp and light emitted from the second lamp unit, and in the light distribution pattern of the low beam, the elbow point is included in a predetermined region formed by light including the light from the first lamp unit, and a first side region and a second side region sandwiching the predetermined region in the left-right direction are formed by the light emitted from the second lamp unit.

In this vehicle headlight, the predetermined region including the elbow point in the light distribution pattern of the low beam is formed by light including the light emitted from the first lamp unit having the light distribution pattern forming unit in which the light emitting units are arranged in a matrix. Therefore, in the vehicle headlight, for example, the intensity distribution of light in the predetermined region can be finely adjusted by adjusting the light amount of the light emitted from each light emitting unit. Here, in the light distribution pattern of the low beam, a change rate in the light intensity in the first side region and the second side region is smaller than that in the predetermined region, and the intensity distribution of the light in the first side region and the second side region is not required to be adjusted more finely than that in the predetermined region. Therefore, the second lamp unit may not be able to finely adjust the intensity distribution of the light in the specific light distribution pattern to be emitted as compared with the first lamp unit, and such a lamp unit may have a simple configuration as compared with the first lamp unit. Therefore, the vehicle headlight can reduce the manufacturing cost as compared with the case where the light distribution pattern of the low beam is formed only by the light emitted from the first lamp unit.

At least a part of the predetermined light distribution pattern and a part of the specific light distribution pattern may overlap each other.

With such a configuration, it is possible to prevent an unintended dark region from being formed in the light distribution pattern of the low beam.

At least a part of an upper edge in the first side region may be located above the horizontal cutoff line.

With such a configuration, visibility on one side in the left-right direction can be improved as compared with a case where the upper edge in the first side region is located below the horizontal cutoff line.

At least a part of an upper edge in the second side region may be located above the horizontal cutoff line.

With such a configuration, visibility on the other side in the left-right direction can be improved as compared with a case where the upper edge in the second side region is located below the horizontal cutoff line.

The specific light distribution pattern may include a first region in which at least a part becomes the first side region in the light distribution pattern of the low beam, and a second region which is separated from the first region and in which at least a part becomes the second side region in the light distribution pattern of the low beam.

In this case, the specific light distribution pattern may further include a third region located between the first region and the second region and connected to the first region and the second region, and an upper edge of the third region may be located below upper edges of the first region and the second region.

In this case, an upper edge on the third region side in the first region may be inclined downward toward the third region and connected to the upper edge in the third region, an upper edge in the third region may extend linearly in a horizontal direction, and the upper edge on the third region side in the second region may be inclined downward toward the third region and connected to the upper edge in the third region.

A part of the predetermined light distribution pattern and a part of the specific light distribution pattern may overlap each other, and a part of the upper edge in the specific light distribution pattern may extend linearly in the horizontal direction to cross the predetermined light distribution pattern.

With such a configuration, the upper edge in the region where a part of the predetermined light distribution pattern and a part of the specific light distribution pattern overlap becomes a straight line extending in the horizontal direction. Therefore, as compared with a case where the upper edge in the overlapping region has a curved shape, for example, it is possible to suppress complication of adjustment of the light amount of the light emitted from the light emitting unit of the light distribution pattern forming unit.

The second lamp unit may include a light source unit that emits light and a shade that blocks a part of the light emitted from the light source unit.

The vehicle headlight may further include a third lamp unit that emits light, and a light distribution pattern of a high beam may be formed by light emitted from the first lamp, the light emitted from the second lamp unit, and the light emitted from the third lamp unit.

The vehicle headlight further includes a control unit, in which the control unit adjusts the light amount of the light emitted from the plurality of light emitting units to change the predetermined light distribution pattern to a light distribution pattern in which the elbow point moves to a predetermined side in the left-right direction by a predetermined distance, a fixed region coinciding with a range from an edge on a side opposite to the predetermined side to a position away from the predetermined side by the predetermined distance in the predetermined region in a first state before the elbow point moves is located in the predetermined region in a second state after the elbow point moves, and an intensity of the light from the first lamp unit in the second state at an arbitrary point in the fixed region is equal to or less than an intensity of light from the first lamp unit in the first state at the arbitrary point and equal to or more than an intensity of light from the first lamp unit in the first state at an intersection of a straight line passing through the arbitrary point and extending in the left-right direction and an edge of the fixed region on a side opposite to the predetermined side.

In this vehicle headlight, as described above, the control unit adjusts the light amount of the light emitted from the plurality of light emitting units, and changes the predetermined light distribution pattern to the light distribution pattern in which the elbow point moves to the predetermined side in the left-right direction by a predetermined distance. Therefore, according to the vehicle headlight, the elbow point can be moved in the left-right direction according to the change in a traveling direction of the vehicle, and visibility in the traveling direction can be improved. In addition, for example, when the elbow point moves to a right side, the fixed region is a region that coincides with a range from a left edge to a position separated to the right by a predetermined distance in the predetermined region in the first state before the elbow point moves. Then, the intensity of the light from the first lamp unit in the second state after the elbow point at the arbitrary point in the fixed region moves is equal to or less than the intensity of the light from the first lamp unit in the first state at the arbitrary point and equal to or more than the intensity of the light from the first lamp unit in the first state at the intersection of the straight line passing through the arbitrary point and extending in the left-right direction and the left edge of the fixed region. For example, when the elbow point is moved in the left-right direction by moving the predetermined light distribution pattern in the left-right direction, the fixed region is not irradiated with the light from the first lamp unit. Therefore, according to this vehicle headlight, as compared with the above case, an amount of change in the light intensity in the fixed region can be reduced, and a driver can be prevented from feeling uncomfortable in the fixed region. Therefore, according to this vehicle headlight, it is possible to prevent the driver from feeling uncomfortable when the elbow point is moved, as compared with the above case.

In a case where the vehicle headlight includes the control unit, the intensity of the light from the first lamp unit in the second state at the arbitrary point may be the same as the intensity of the light from the first lamp unit in the first state at the intersection of the straight line passing through the arbitrary point and extending in the left-right direction and the edge of the fixed region on the side opposite to the predetermined side.

With such a configuration, the intensity of the light from the first lamp unit in the second state in the fixed region is constant in the left-right direction, and it is possible to simplify the adjustment of the light amount of the light emitted from the plurality of light emitting units by the control unit.

When the vehicle headlight includes the control unit, the predetermined region may include a hot zone, and the hot zone may move together with the elbow point to the predetermined side by the predetermined distance.

According to such a configuration, it is possible to further prevent the driver from feeling uncomfortable.

In this case, the intensity of light from the first lamp unit in the second state may gradually increase from the edge on the predetermined side of the fixed region toward the hot zone.

With such a configuration, it is possible to further prevent the driver from feeling uncomfortable when the elbow point and the hot zone are moved.

When the predetermined region include the hot zone, the intensity of the light from the first lamp unit in the second state may gradually increase from the edge of the fixed region on the side opposite to the predetermined side toward the hot zone.

With such a configuration, it is possible to further prevent the driver from feeling uncomfortable when the elbow point and the hot zone are moved.

When the vehicle headlight includes the control unit, an edge on the predetermined side of the predetermined region in the first state may be located in the predetermined region in the second state, and an intensity of light from the first lamp unit in the second state at an arbitrary reference point on a reference line coinciding with the edge on the predetermined side of the predetermined region in the first state may be equal to or more than an intensity of light from the first lamp unit in the first state at the arbitrary reference point and equal to or less than an intensity of light from the first lamp unit at the arbitrary reference point when the predetermined light distribution pattern in the first state moves to the predetermined side by the predetermined distance.

With such a configuration, as compared with a case where the elbow point is moved in the left-right direction by moving the predetermined light distribution pattern in the left-right direction, the amount of change in the intensity of light on the above line can be prevented from increasing, and the driver can be prevented from easily feeling uncomfortable about the change in the light amount on the reference line.

In this case, the intensity of light from the first lamp unit in the second state at the arbitrary reference point may be the same as the intensity of light from the first lamp unit in the first state at the arbitrary reference point.

With such a configuration, on the reference line, since the intensity of the light from the first lamp unit does not change when the elbow point is moved, it is possible to further prevent the driver from feeling uncomfortable.

When the edge on the predetermined side of the predetermined region in the first state is located in the predetermined region in the second state, the predetermined region may include the hot zone, the hot zone may move together with the elbow point to the predetermined side by the predetermined distance, and the intensity of the light from the first lamp unit in the second state may gradually increase from the reference line toward the hot zone.

With such a configuration, it is possible to further prevent the driver from feeling uncomfortable when the elbow point and the hot zone are moved.

DESCRIPTION OF EMBODIMENTS

Hereinafter, embodiments for implementing a vehicle headlight according to the present invention will be illustrated together with the accompanying drawings. The embodiments exemplified below are intended to facilitate understanding of the present invention and are not intended to limit the present invention. The present invention can be modified and improved from the following embodiments without departing from the gist thereof. In the accompanying drawings, the dimensions of each member may be exaggerated for easy understanding.

First Embodiment

Figure 1:
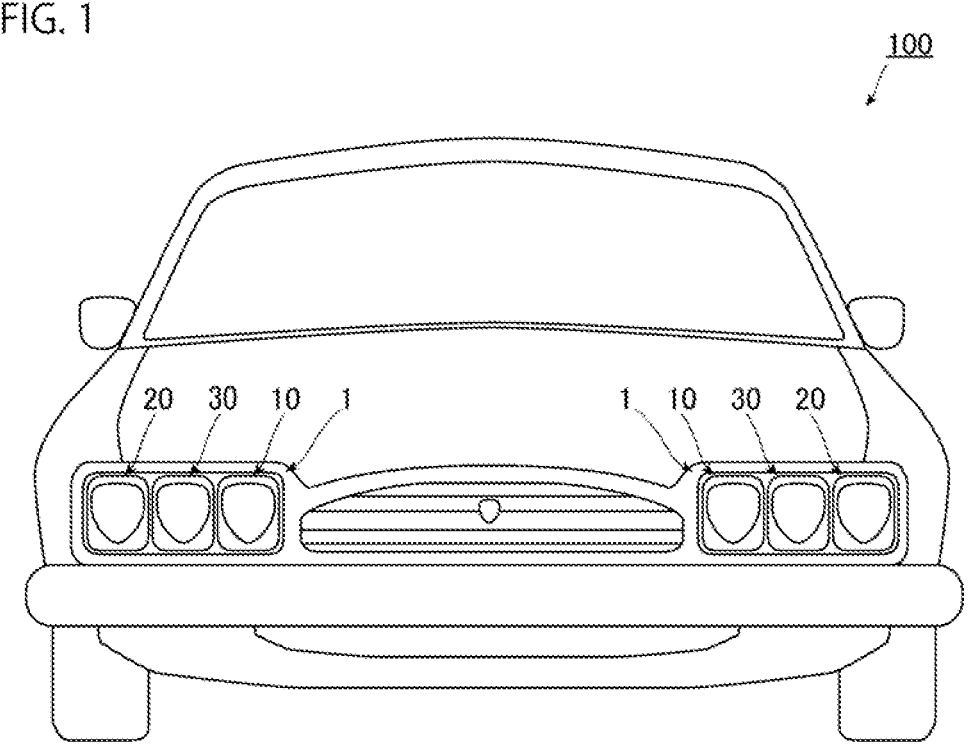
FIG. 1 is a front view schematically illustrating a vehicle including a vehicle headlight according to a first embodiment of the present invention.

A first embodiment of the present invention will be described. FIG. 1 is a front view schematically illustrating a vehicle including a vehicle headlight according to the present embodiment. As illustrated in FIG. 1, a vehicle 100 includes a pair of vehicle headlights 1 in front left and right directions. The pair of vehicle headlights 1 provided in the vehicle 100 has symmetrical shapes in a left-right direction. The vehicle headlight 1 of the present embodiment includes a first lamp unit 10, a second lamp unit 20, and a third lamp unit 30. These lamp units 10, 20, and 30 are arranged side by side, the first lamp unit 10 is arranged on the most center side of the vehicle 100, the second lamp unit 20 is arranged on the outermost side of the vehicle 100, and the third lamp unit 30 is arranged between the first lamp unit 10 and the second lamp unit 20. In the present embodiment, as described below, the first lamp unit 10 and the second lamp unit 20 are low-beam lamps, and the third lamp unit 30 is a high-beam lamp unit. For this reason, the vehicle headlight 1 can switch light to be emitted between a low beam and a high beam by switching a lamp unit that emits light by a control unit.

Figure 2:
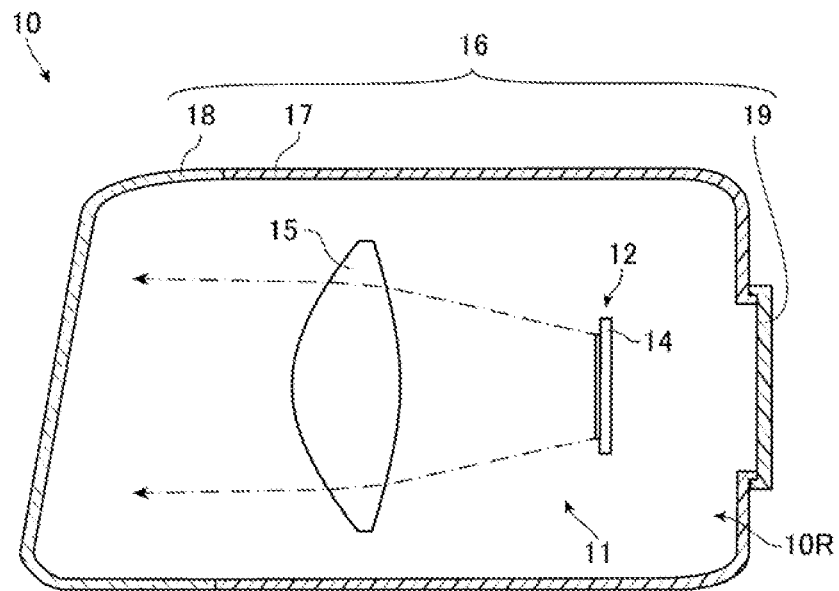
FIG. 2 is a side view schematically illustrating a first lamp unit illustrated in FIG. 1.

FIG. 2 is a side view schematically illustrating the first lamp unit 10 illustrated in FIG. 1. As illustrated in FIG. 2, the first lamp unit 10 includes a first emission unit 11 and a housing 16 as main components, and is a lamp unit that emits a part of a low beam. In FIG. 2, the housing 16 is illustrated in a vertical cross section.

The housing 16 mainly includes a lamp housing 17, a front cover 18, and a back cover 19. The front of the lamp housing 17 is opened, and the front cover 18 is fixed to the lamp housing 17 so as to close the opening. An opening smaller than the front opening is formed behind the lamp housing 17, and the back cover 19 is fixed to the lamp housing 17 so as to close the rear opening.

A space formed by the lamp housing 17, the front cover 18 closing the front opening of the lamp housing 17, and the back cover 19 closing the rear opening of the lamp housing 17 is a lamp chamber 10R, and the first emission unit 11 is accommodated in the lamp chamber 10R. The first emission unit 11 mainly includes a light distribution pattern forming unit 12 and a projection lens 15.

Figure 3:
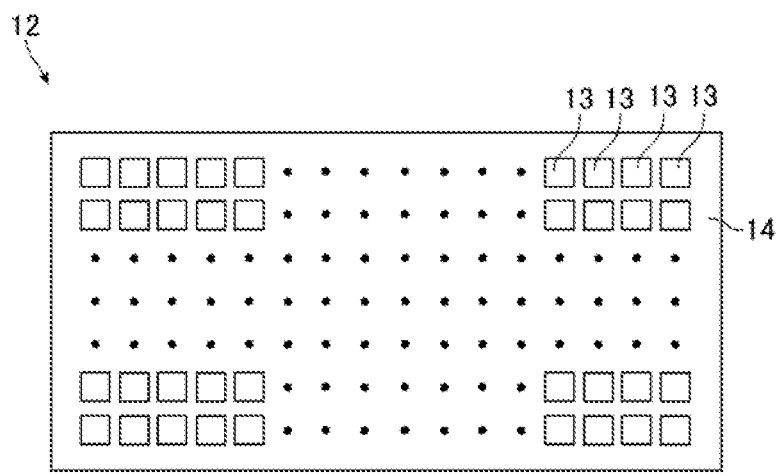
FIG. 3 is a front view schematically illustrating a light distribution pattern forming unit illustrated in FIG. 2.

FIG. 3 is a front view schematically illustrating the light distribution pattern forming unit 12 illustrated in FIG. 2. As illustrated in FIGS. 2 and 3, the light distribution pattern forming unit 12 of the present embodiment includes a plurality of light emitting elements 13 as light emitting units that emit light, and a circuit board 14 on which the plurality of light emitting elements 13 is mounted. The plurality of light emitting elements 13 are arranged in a matrix form to form rows in an up-down direction and the left-right direction, and emit light forward. The plurality of light emitting elements 13 can individually change a light amount of light emitted. In the present embodiment, the light distribution pattern forming unit 12 has 32 light emitting element groups each including 96 light emitting elements 22a arranged in the left-right direction, and these light emitting element groups are arranged in the up-down direction. In addition, these light emitting elements 13 are micro light emitting diodes (LEDs), and the light distribution pattern forming unit 12 is a so-called micro LED array. Note that the number of light emitting elements 13 in each light emitting element group and the number of light emitting element groups are not particularly limited.

Such a light distribution pattern forming unit 12 can form a predetermined light distribution pattern by selecting the light emitting element 13 that emits light. In addition, the light distribution pattern forming unit 12 can adjust the intensity distribution of the light in the predetermined light distribution pattern by adjusting the light amount of the light emitted from each light emitting element 13. That is, it can be understood that the light distribution pattern forming unit 12 forms a predetermined light distribution pattern according to the light amount of light emitted from the plurality of light emitting elements 13.

The projection lens 15 is a lens that adjusts a divergence angle of incident light. The projection lens 15 is disposed in front of the light distribution pattern forming unit 12, light emitted from the light distribution pattern forming unit 12 is incident on the projection lens, and a divergence angle of the light is adjusted by the projection lens 15. The projection lens 15 is a lens in which the incident surface and the emission surface are formed in a convex shape, and a rear focal point of the projection lens 15 is located on or near the light emission surface of any one of the light emitting elements 13 in the light distribution pattern forming unit 12. The light whose divergence angle is adjusted by the projection lens 15 is emitted from the first lamp unit 10 toward the front of the vehicle 100 via the front cover 18.

Figure 4:
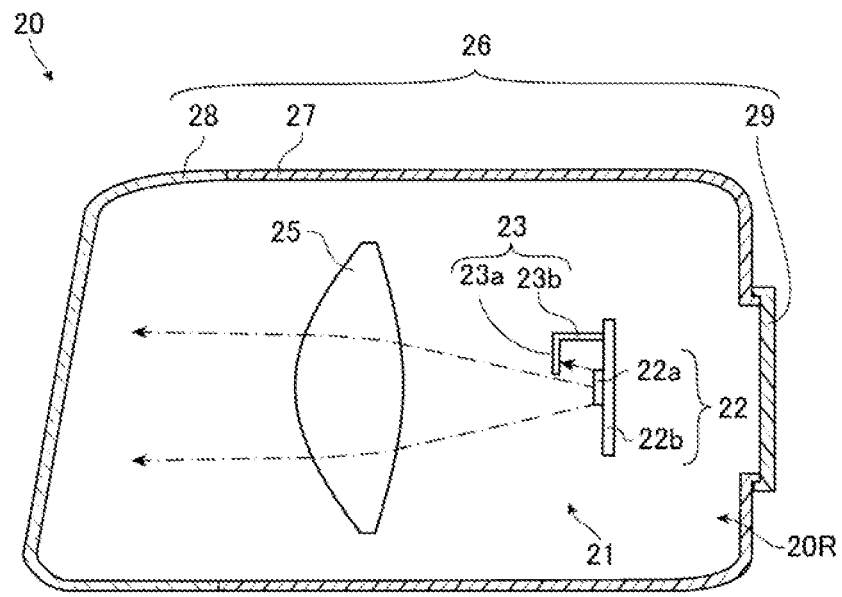
FIG. 4 is a side view schematically illustrating a second lamp unit illustrated in FIG. 1.

FIG. 4 is a side view schematically illustrating the second lamp unit 20 illustrated in FIG. 1. As illustrated in FIG. 4, the second lamp unit 20 mainly includes a second emission unit 21 and a housing 26, and is a lamp unit that emits another part of the low beam. In FIG. 4, the housing 26 is illustrated in a vertical cross section. The housing 26 has a configuration similar to that of the housing 16 of the first lamp unit 10, and includes a lamp housing 27, a front cover 28, and a back cover 29 as main configurations, and the second emission unit 21 is accommodated in a lamp chamber 20R formed by the housing 26. The second emission unit 21 mainly includes a light source unit 22, a shade 23, and a projection lens 25.

Figure 5:
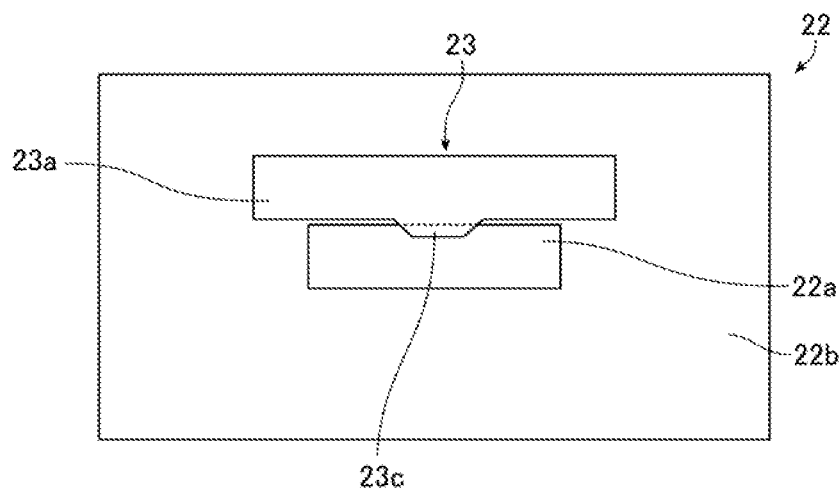
FIG. 5 is a front view schematically illustrating a light source unit illustrated in FIG. 4.

FIG. 5 is a front view schematically illustrating the light source unit 22 illustrated in FIG. 4. Note that the shade 23 is also illustrated in FIG. 5. As illustrated in FIGS. 4 and 5, the light source unit 22 of the present embodiment includes a light emitting element 22a that emits light and a circuit board 22b on which the light emitting element 22a is mounted. In the present embodiment, the light emitting element 22a has a substantially rectangular LED whose light emitting surface is long in the left-right direction, and emits light forward.

The shade 23 includes a light shielding portion 23a and a fixing portion 23b. In the present embodiment, the light shielding portion 23a and the fixing portion 23b are integrally formed by bending a plate-shaped member. The light shielding portion 23a extends in the left-right direction in front of the light emitting element 22a of the light source unit 22, and the fixing portion 23b is connected to an upper end portion of the light shielding portion 23a. The fixing portion 23b extends rearward from the upper end portion of the light shielding portion 23a, and an end portion of the fixing portion 23b on a side opposite to the light shielding portion 23a side is fixed to the circuit board 22b. The light shielding portion 23a is located above an optical axis of the light emitting element 22a, and a protrusion 23c protruding downward in a substantially isosceles trapezoidal shape is provided at a central portion in the left-right direction of a lower end portion of the light shielding portion 23a. The light shielding portion 23a of such a shade 23 shields a part of light emitted from the light emitting element 22a.

Similarly to the projection lens 15, the projection lens 25 is a lens that adjusts a divergence angle of incident light. The projection lens 25 is a lens in which an incident surface and an emission surface are formed in a convex shape, and is disposed in front of the shade 23. A rear focal point of the projection lens 25 is located on or near the light emission surface of the light emitting element 22a. As described above, a part of the light emitted from the light emitting element 22a is shielded by the light shielding portion 23a of the shade 23, another part of the light emitted from the light emitting element 22a is incident on the projection lens 25, and light of a specific light distribution pattern corresponding to the shape of the light shielding portion 23a is emitted from the projection lens 25. As described above, the light having the specific light distribution pattern emitted from the projection lens 25 is emitted from the second lamp unit 20 toward the front of the vehicle 100 via the front cover 28.

Figure 6:
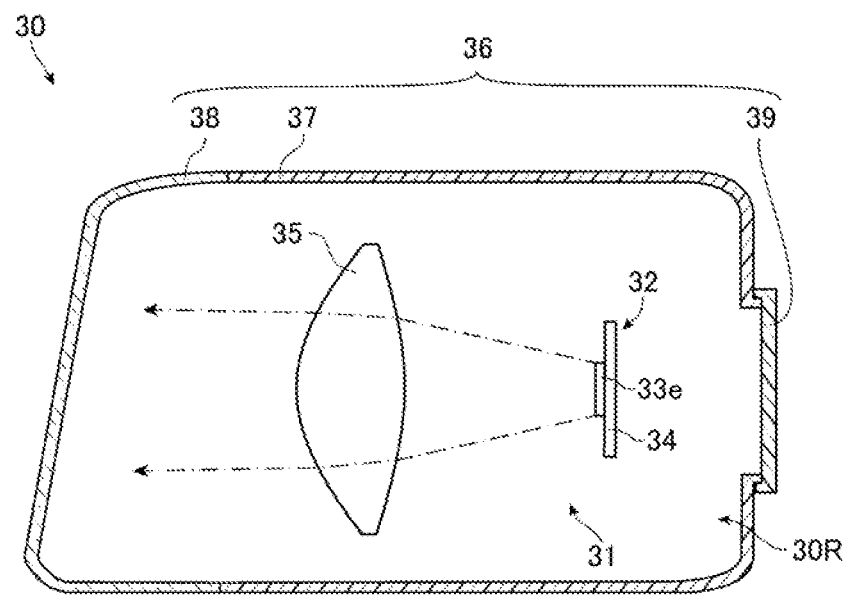
FIG. 6 is a side view schematically illustrating a third lamp unit illustrated in FIG. 1.

FIG. 6 is a side view schematically illustrating the third lamp unit 30 illustrated in FIG. 1. As illustrated in FIG. 6, the third lamp unit 30 includes a third emission unit 31 and a housing 36 as main components, and is a lamp unit that emits a part of a high beam. In FIG. 6, the housing 36 is illustrated in a vertical cross section. The housing 36 has a configuration similar to that of the housing 16 of the first lamp unit 10, and mainly includes a lamp housing 37, a front cover 38, and a back cover 39, and the third emission unit 31 is accommodated in a lamp chamber 30R formed by the housing 36. The third emission unit 31 mainly includes a light distribution pattern forming unit 32 and a projection lens 35.

Figure 7:
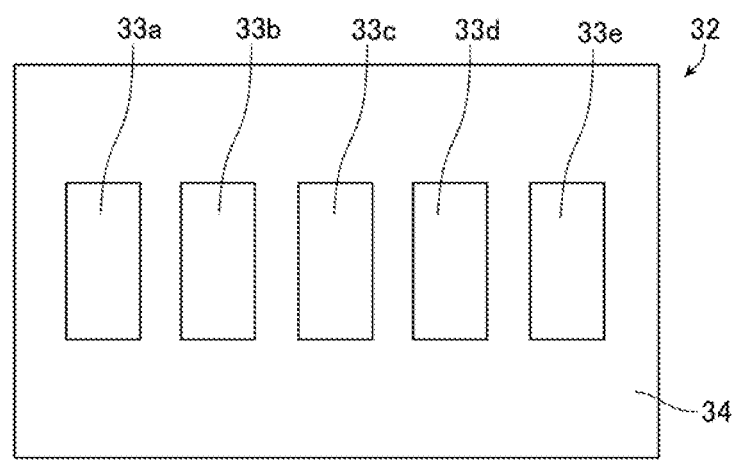
FIG. 7 is a front view schematically illustrating a light distribution pattern forming unit illustrated in FIG. 6.

FIG. 7 is a front view schematically illustrating the light distribution pattern forming unit 32 illustrated in FIG. 6. As illustrated in FIGS. 6 and 7, the light distribution pattern forming unit 32 of the present embodiment includes a plurality of light emitting elements 33a to 33e that emit light and a circuit board 34 on which the plurality of light emitting elements 33a to 33e are mounted. In addition, these light emitting elements 33a to 33e are larger than the light emitting element 13 in the first lamp unit 10, and are substantially rectangular LEDs whose light emitting surfaces are elongated in the up-down direction. In addition, the light emitting elements 33a to 33e are arranged in a line in the left-right direction, and the light distribution pattern forming unit 32 is a so-called LED array, and in the present embodiment, five LDEs are arranged. Note that the number of light emitting elements is not particularly limited, and the plurality of light emitting elements may be arranged in a matrix.

Thus, the light distribution pattern forming unit 32 can form a predetermined light distribution pattern by selecting the light emitting elements 33a to 33e that emit light. In addition, the light distribution pattern forming unit 32 can adjust the intensity distribution of light in a predetermined light distribution pattern by adjusting the light amount of light emitted from each of the light emitting elements 33a to 33e. That is, it can be understood that the light distribution pattern forming unit 32 forms a predetermined light distribution pattern according to the light amount of the light emitted from the plurality of light emitting elements 33a to 33e.

Similarly to the projection lens 15, the projection lens 35 is a lens that adjusts a divergence angle of incident light. The projection lens 35 is disposed in front of the light distribution pattern forming unit 32, light emitted from the light distribution pattern forming unit 32 is incident on the projection lens, and the divergence angle of the light is adjusted by the projection lens 35. The projection lens 35 is a lens in which the incident surface and the emission surface are formed in a convex shape, and a rear focal point of the projection lens 35 is located on or near the light emission surface of the light emitting element 33c in the light distribution pattern forming unit 32. The light whose divergence angle is adjusted by the projection lens 35 is emitted from the second lamp unit 20 toward the front of the vehicle 100 via the front cover 38.

Figure 8:
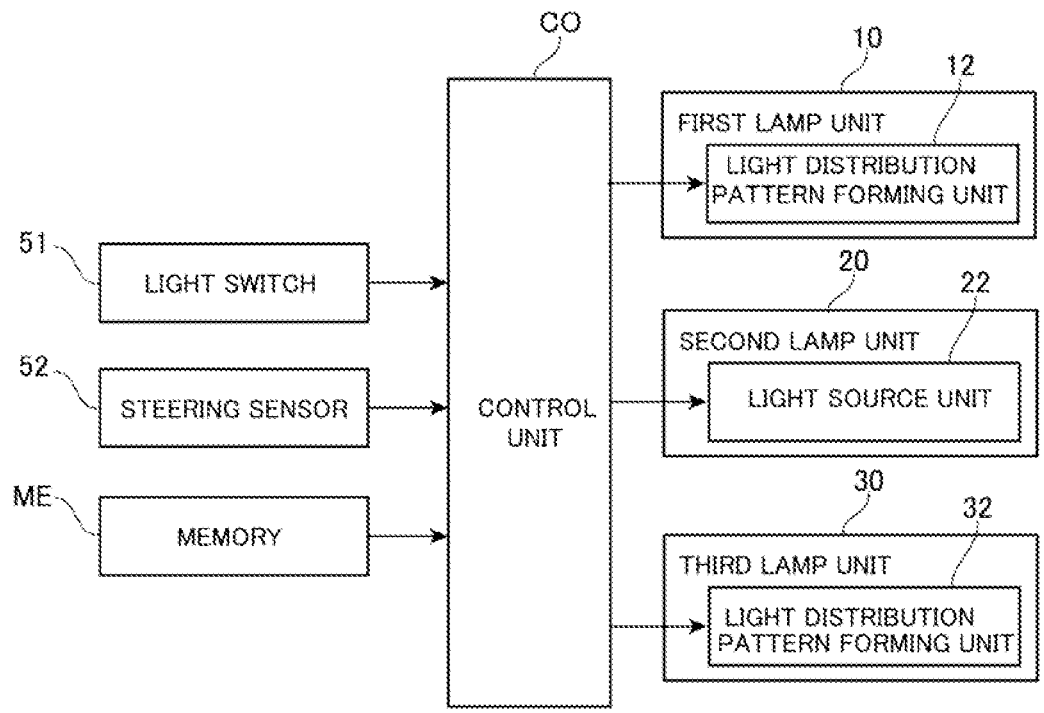
FIG. 8 is a block diagram including the vehicle headlight in the first embodiment.

FIG. 8 is a block diagram including the vehicle headlight 1 according to the present embodiment. As illustrated in FIG. 8, in the present embodiment, the light distribution pattern forming unit 12 of the first lamp unit 10, the light source unit 22 of the second lamp unit 20, the light distribution pattern forming unit 32 of the third lamp unit 30, a light switch 51, a steering sensor 52, a memory ME, and the like are electrically connected to the control unit CO. The control unit CO may be a part of an electronic control device of the vehicle 100. In addition, the light switch 51 and the steering sensor 52 may be electrically connected to the control unit CO via the electronic control device of the vehicle 100.

For example, an integrated circuit such as a microcontroller, an integrated circuit (IC), a large-scale integrated circuit (LSI), or an application specific integrated circuit (ASIC), or a numerical control (NC) device can be used as the control unit CO. In addition, when the NC device is used, the control unit CO may use a machine learning device or may not use a machine learning device. Then, as described below, the light distribution pattern forming unit 12 of the first lamp unit 10, the light source unit 22 of the second lamp unit 20, and the light distribution pattern forming unit 32 of the third lamp unit 30 are controlled by the control unit CO.

The light switch 51 is a switch that selects one of emission of a low beam, emission of a high beam, and non-emission of a low beam and a high beam. For example, the light switch 51 outputs a signal indicating the emission of the low beam to the control unit CO in a case where the emission of the low beam is selected, and outputs a signal indicating the emission of the high beam to the control unit CO in a case where the emission of the high beam is selected. In addition, the light switch 51 does not output a signal to the control unit CO when non-emission of the low beam and the high beam is selected.

The steering sensor 52 is a sensor that detects a rotation angle of a steering wheel of the vehicle 100, that is, a steering angle of the vehicle 100, and detects these steering angles while identifying a right steering angle and a left steering angle as different steering angles. The steering sensor 52 outputs a signal corresponding to a steering angle based on the time when the vehicle 100 travels straight to the control unit CO.

The memory ME is, for example, a non-transitory recording medium, and is preferably a semiconductor recording medium such as a random access memory (RAM) or a read only memory (ROM), but may include a recording medium of any format such as an optical recording medium or a magnetic recording medium. Note that the "non-transitory" recording medium includes all computer-readable recording media except for a transitory propagating signal (transitory, propagating signal), and does not exclude a volatile recording medium. The memory ME stores a table in which information on the light amount of the light emitted from each of the plurality of light emitting elements 13 in the light distribution pattern forming unit 12 of the first lamp unit 10 is associated with the steering angle of the vehicle 100. Examples of the information on the light amount of the light emitted from each of the plurality of light emitting elements 13 include a current value supplied to each of the plurality of light emitting elements 13. Although details will be described later, the vehicle headlight 1 of the present embodiment is configured such that the position in the left-right direction of the elbow point in the emitted low beam is a position corresponding to the steering angle of the vehicle 100. In other words, the vehicle headlight 1 of the present embodiment is configured to emit the low beam according to the steering angle of the vehicle 100.

Next, the low beam emitted from the vehicle headlight 1 will be described.

In the present embodiment, as described above, the first lamp unit 10 and the second lamp unit 20 of the vehicle headlight 1 are low-beam lamp units, and a light distribution pattern of the low beam is formed by light emitted from the first lamp unit 10 and light emitted from the second lamp unit 20.

Figure 9:
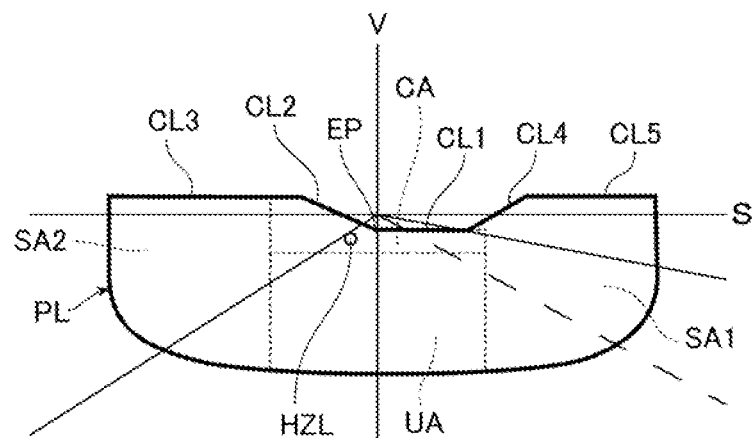
FIG. 9 is a diagram illustrating a light distribution pattern of a low beam in the first embodiment.

FIG. 9 is a diagram illustrating the light distribution pattern of the low beam in the present embodiment. In FIG. 9, S indicates a horizontal line, V indicates a vertical line passing through the center of the vehicle 100 in the left-right direction, and a light distribution pattern PL of a low beam formed on a virtual vertical screen arranged 25 m ahead of the vehicle 100 is indicated by a thick line. The light distribution pattern PL of the low beam of the present embodiment has cutoff lines CL3, CL4, and CL5 at the upper edge together with a cutoff line CL1 as a horizontal cutoff line and a cutoff line CL2 as an inclined cutoff line. The cutoff line CL1 as a horizontal cutoff line extends in the horizontal direction from an elbow point EP located below a horizontal line S and on or near a vertical line V to the right side which is one side in the left-right direction. The cutoff line CL2 as the inclined cutoff line extends obliquely upward from the elbow point EP to the left side which is the other side in the left-right direction, and an end of the cutoff line CL2 on the side opposite to the elbow point EP is located above the horizontal line S. The cutoff line CL3 extends in the horizontal direction from an end of the cutoff line CL2 opposite to the elbow point EP side to the other side in the left-right direction. The cutoff line CL4 extends obliquely upward from the end on the side opposite to the elbow point EP side in the cutoff line CL1 to one side in the left-right direction, and the end on the side opposite to the cutoff line CL1 side in the cutoff line CL4 is located above the horizontal line S. The cutoff line CL5 extends in the horizontal direction from an end of the cutoff line CL4 opposite to the cutoff line CL1 side to one side in the left-right direction. The cutoff line CL5 and the cutoff line CL3 are located at substantially the same height. In addition, a hot zone HZL, which is a region having the highest light intensity in the light distribution pattern PL of the low beam, is located in the vicinity of the elbow point EP. Here, the outer shape of the light distribution pattern is defined by, for example, an equal intensity line formed by a group of points at which the intensity of light becomes a value of a predetermined ratio with respect to the maximum intensity value of light in the light distribution pattern. The outer shape of the light distribution pattern of the present embodiment is defined by an equal intensity line formed by a group of points at which the intensity of light is 1.5% of the maximum intensity value of light in the light distribution pattern. However, the definition of the outer shape of the light distribution pattern is not particularly limited.

Figure 10A:
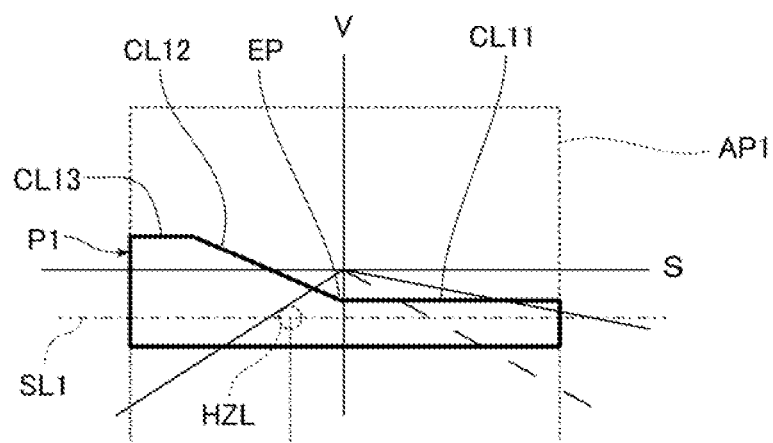
FIG. 10A is a diagram illustrating a predetermined light distribution pattern of light emitted from the first lamp unit when the light distribution pattern of the low beam illustrated in FIG. 9 is formed.
Figure 10B:
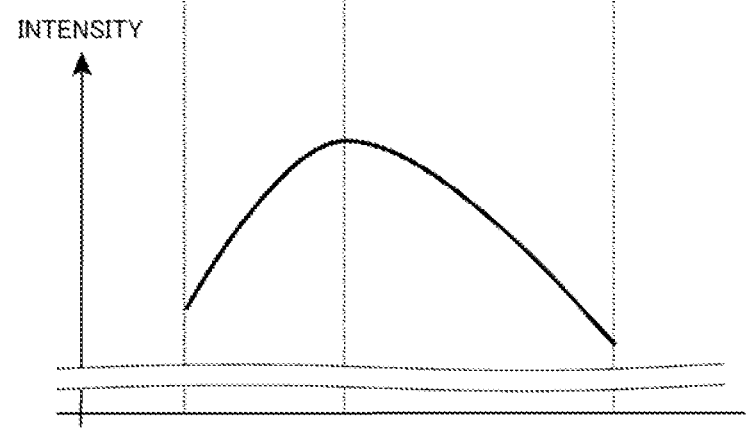
FIG. 10B is a diagram illustrating an intensity distribution of light in the light distribution pattern.

FIG. 10A is a diagram illustrating a predetermined light distribution pattern of light emitted from the first lamp unit 10 when the light distribution pattern of the low beam illustrated in FIG. 9 is formed, and FIG. 10B is a diagram illustrating an intensity distribution of light in the light distribution pattern. In FIG. 10A, S indicates a horizontal line, V indicates a vertical line passing through the center of the vehicle 100 in the left-right direction, and a predetermined light distribution pattern P1 of light emitted from the first lamp unit 10 formed on a virtual vertical screen arranged 25 m ahead of the vehicle 100 is indicated by a thick line. In FIG. 10A, the position of the hot zone HZL and the region AP1 to which the first lamp unit 10 can emit light are indicated by dotted lines. In addition, the light intensity distribution illustrated in FIG. 10B is a distribution on a straight line SL1 passing through the hot zone HZL and extending in the left-right direction, and is indicated by a thick line. The straight line SL1 is parallel to the horizontal direction. The predetermined light distribution pattern P1 of the present embodiment has cutoff lines CL11, CL12, and CL13 at the upper edge. The cutoff line CL11 corresponds to the cutoff line CL1 in the light distribution pattern PL of the low beam, and extends in the horizontal direction from the elbow point EP to the right side which is one side in the left-right direction. The cutoff line CL12 corresponds to the cutoff line CL2 in the light distribution pattern PL of the low beam, and extends obliquely upward from the elbow point EP to the left side which is the other side in the left-right direction, and an end of the cutoff line CL2 on the side opposite to the elbow point EP side is located above the horizontal line S. The cutoff line CL13 corresponds to the cutoff line CL3 in the light distribution pattern PL of the low beam, and extends in the horizontal direction from an end of the cutoff line CL12 opposite to the elbow point EP side to the other side in the left-right direction. As illustrated in FIG. 10A and FIG. 10B, the light intensity in the predetermined light distribution pattern P1 gradually increases toward the hot zone HZL in the left-right direction. The control unit CO adjusts the light amount of the light emitted from each light emitting element in the light distribution pattern forming unit 12 such that the outer shape, the position, and the light intensity distribution of the predetermined light distribution pattern P1 of the light emitted from the first lamp unit 10 are as described above.

Figure 11:
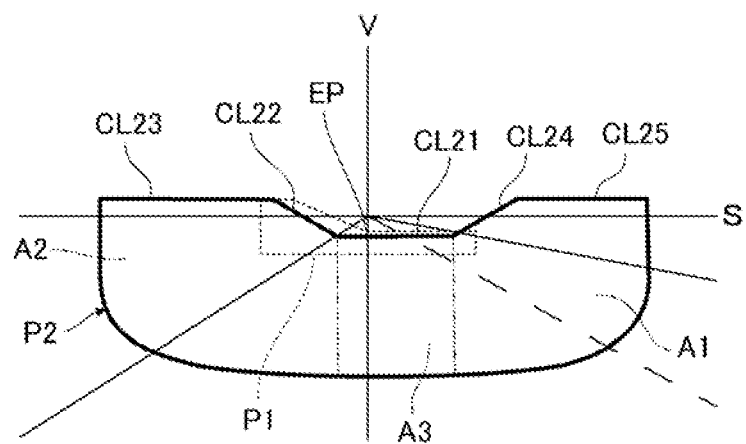
FIG. 11 is a diagram illustrating a specific light distribution pattern of light emitted from the second lamp unit.

FIG. 11 is a diagram illustrating a specific light distribution pattern of the light emitted from the second lamp unit 20. In FIG. 11, S indicates a horizontal line, V indicates a vertical line passing through the center of the vehicle 100 in the left-right direction, and a specific light distribution pattern P2 formed on a virtual vertical screen arranged 25 m ahead of the vehicle 100 is indicated by a thick line. In FIG. 11, a predetermined light distribution pattern P1 emitted from the first lamp unit 10 illustrated in FIG. 10A is indicated by a dotted line. The specific light distribution pattern P2 of the present embodiment includes a first region A1, a second region A2, and a third region A3. The first region A1 is located on one side in the left-right direction. The second region A2 is separated from the first region A1 and is located on the other side in the left-right direction. The third region A3 is located between the first region A1 and the second region A2 in the left-right direction and connected to the first region A1 and the second region A2. In FIG. 11, a boundary between the first region A1 and the third region A3 and a boundary between the second region A2 and the third region A3 are indicated by two-dot chain lines.

An upper edge of the specific light distribution pattern P2 corresponds to a shape of a lower end of the light shielding portion 23a of the shade 23, and has cutoff lines CL21, CL22, CL23, CL24, and CL25. The cutoff line CL21 is an upper edge of the third region A3 and extends in the horizontal direction below the elbow point EP. One end of the cutoff line CL21 is located on one side of the elbow point EP in the left-right direction, and the other end of the cutoff line CL21 is located on the other side of the elbow point EP in the left-right direction.

The cutoff line CL22 is a part of an upper edge of the second region A2, and extends obliquely upward from the other end in the left-right direction of the cutoff line CL21 to the other side. The cutoff line CL23 is another part of the upper edge of the second region A2, and extends in the horizontal direction from the end of the cutoff line CL22 opposite to the cutoff line CL21 side to the other side in the left-right direction. Therefore, the upper edges in the second region A2 are the cutoff lines CL22 and CL23, and the cutoff line CL21, which is the upper edge of the third region A3, is located below these cutoff lines CL22 and CL23. In addition, it can be understood that the upper edge on the third region A3 side in the second region A2 is the cutoff line CL22, is inclined downward toward the third region A3 side, and is connected to the upper edge in the third region A3.

The cutoff line CL24 is a part of the upper edge of the first region A1 and corresponds to the cutoff line CL4 in the light distribution pattern PL of the low beam. The cutoff line CL24 extends obliquely upward from one end in the left-right direction of the cutoff line CL21 to one side. The cutoff line CL24 on the cutoff line CL21 side is located within a predetermined light distribution pattern P1. The cutoff line CL25 is another part of the upper edge of the first region A1 and corresponds to the cutoff line CL5 in the light distribution pattern PL of the low beam. The cutoff line CL25 extends in the horizontal direction from an end of the cutoff line CL24 on the side opposite to the cutoff line CL21 side to one side in the left-right direction. Therefore, the upper edges in the first region A1 are the cutoff lines CL24 and CL25, and the cutoff line CL21, which is the upper edge of the third region A3, is located below these cutoff lines CL24 and CL25. In addition, it can be understood that the upper edge on the third region A3 side in the first region A1 is the cutoff line CL24, is inclined downward toward the third region A3 side, and is connected to the upper edge in the third region A3.

In the present embodiment, a part of the specific light distribution pattern P2 and a part of the predetermined light distribution pattern P1 overlap each other. Specifically, one side in the left-right direction of the predetermined light distribution pattern P1 overlaps a part of the first region A1 of the specific light distribution pattern P2. The other side in the left-right direction of the predetermined light distribution pattern P1 overlaps with a part of the second region A2 of the specific light distribution pattern P2. The lower side of the central portion in the left-right direction in the predetermined light distribution pattern P1 overlaps a part of the third region A3 of the specific light distribution pattern P2. The entire cutoff line CL12 in the specific light distribution pattern P2 is located in the predetermined light distribution pattern P1. The entire cutoff line CL22 in the specific light distribution pattern P2 is located in the predetermined light distribution pattern P1. In addition, the cutoff line CL23 in the specific light distribution pattern P2 is located at substantially the same height as the CL13 in the predetermined light distribution pattern P1, and the cutoff line CL23 side of the cutoff line CL22 overlaps the CL13.

Then, the light having the predetermined light distribution pattern P1 emitted from the first lamp unit 10 and the light having the specific light distribution pattern P2 emitted from the second lamp unit 20 form the light distribution pattern PL of the low beam illustrated in FIG. 9. As illustrated in FIG. 9, the elbow point EP and the hot zone HZL are included in the predetermined region CA formed by the light including the light from the first lamp unit 10 in the light distribution pattern PL of the low beam. The predetermined region CA is a region overlapping the predetermined light distribution pattern P1. In the light distribution pattern PL of the low beam, a first side region SA1 on one side and a second side region SA2 on the other side of the predetermined region CA in the left-right direction, and a lower region UA located below the predetermined region CA and between the first side region SA1 and the second side region SA2 are irradiated with only the light emitted from the second lamp unit 20. That is, the predetermined region CA is sandwiched between the first side region SA1 and the second side region SA2 in the left-right direction, and the first side region SA1, the second side region SA2, and the lower region UA are formed by another part of the light having the specific light distribution pattern P2 emitted from the second lamp unit 20. In FIG. 9, the boundaries of these regions CA, SA1, SA2, and UA are indicated by dotted lines. The first side region SA1 is a part of the first region A1 in the specific light distribution pattern P2 of the light emitted from the second lamp unit 20, and the second side region SA2 is a part of the second region A2 in the specific light distribution pattern P2. Further, the lower region UA is formed from another part of the first region A1, another part of the second region A2, and a part of the third region A3 in the specific light distribution pattern P2.

Further, the cutoff line CL1 in the light distribution pattern PL of the low beam is formed of the cutoff line CL11 in the predetermined light distribution pattern P1 emitted from the first lamp unit 10, and the cutoff line CL2 in the light distribution pattern PL of the low beam is formed of the cutoff line CL12 in the predetermined light distribution pattern P1.

The cutoff line CL3 in the light distribution pattern PL of the low beam is formed of the cutoff line CL13 in the predetermined light distribution pattern P1 and the cutoff line CL23 in the specific light distribution pattern P2. The cutoff line CL3 is an upper edge in the second side region SA2 and is located above the cutoff line CL1 as a horizontal cutoff line.

In addition, the cutoff line CL4 in the light distribution pattern PL of the low beam is formed from the cutoff line CL24 in the specific light distribution pattern P2, and the cutoff line CL5 in the light distribution pattern PL of the low beam is formed from the cutoff line CL25 in the specific light distribution pattern P2. The cutoff line CL5 is a part of the upper edge in the first side region SA1, and is located above the cutoff line CL1 as a horizontal cutoff line.

Next, the high beam emitted from the vehicle headlight 1 will be described.

In the present embodiment, as described above, the third lamp unit 30 of the vehicle headlight 1 is a high-beam lamp unit, and the light distribution pattern of the high beam is formed by light emitted from the first lamp unit 10, light emitted from the second lamp unit 20, and light emitted from the third lamp unit 30.

Figure 12:
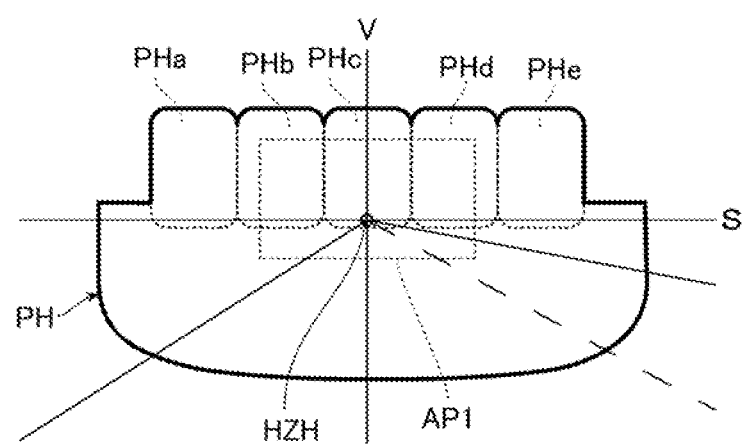
FIG. 12 is a diagram illustrating a light distribution pattern of a high beam.

FIG. 12 is a diagram illustrating the light distribution pattern of the high beam. In FIG. 12, S indicates a horizontal line, V indicates a vertical line passing through the center of the vehicle 100 in the left-right direction, and a light distribution pattern PH of a high beam formed on a virtual vertical screen arranged 25 m ahead of the vehicle 100 is indicated by a thick line. In the present embodiment, the hot zone HZH, which is a region having the highest light intensity in the light distribution pattern PH of the high beam, is located on or near an intersection of the horizontal line S and the vertical line V. Note that, in FIG. 12, regions PHa to PHe irradiated with light emitted from the plurality of light emitting elements 33a to 33e in the third lamp unit 30 and a region AP1 to which the first lamp unit 10 can emit light are also illustrated. These regions PHa to PHe are arranged in the left-right direction, the region PHa is irradiated with light emitted from the light emitting element 33a, the region PHb is irradiated with light emitted from the light emitting element 33b, the region PHc is irradiated with light emitted from the light emitting element 33c, the region PHd is irradiated with light emitted from the light emitting element 33d, and the region PHe is irradiated with light emitted from the light emitting element 33e. That is, the third lamp unit 30 emits light with which the PHa to PHe are irradiated. Note that these regions PHa to PHe may overlap other adjacent regions. The hot zone HZH overlaps the region PHc and the region AP1.

In the present embodiment, when the high beam is emitted from the vehicle headlight 1, the light is emitted from all the light emitting elements 13 in the first lamp unit 10, and the outer shape of the predetermined light distribution pattern of the light emitted from the first lamp unit 10 is the same as that of the region AP1. The intensity distribution of the light in the predetermined light distribution pattern of the light emitted from the first lamp unit 10 is, for example, a distribution in which the intensity decreases as the distance from the hot zone HZH increases, and the light amount of the light emitted from each light emitting element 13 in the first lamp unit 10 is adjusted by the control unit CO so as to have such a distribution. Similarly to the case of emitting the low beam, the second lamp unit 20 emits the light having the specific light distribution pattern P2. As described above, light is emitted from the first lamp unit 10, the second lamp unit 20, and the third lamp unit 30, whereby the high beam is emitted from the vehicle headlight 1.

Figure 13:
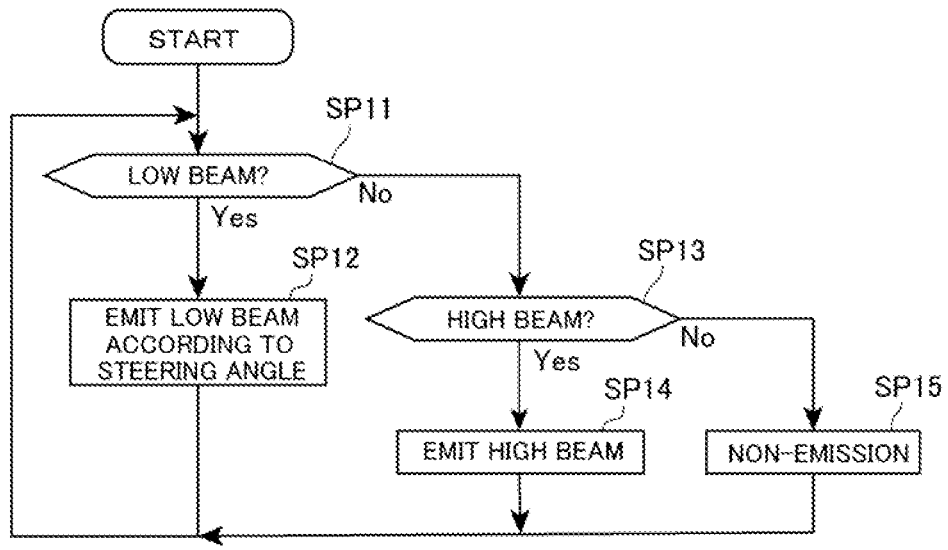
FIG. 13 is a diagram illustrating an example of a control flowchart of a control unit according to the first embodiment.

Next, the operation of the vehicle headlight 1 of the present embodiment will be described. FIG. 13 is a diagram illustrating an example of a control flowchart of the control unit according to the present embodiment. As illustrated in FIG. 13, the control flow of the present embodiment includes Steps SP11 to SP15.

(Step SP11)

First, the control unit CO determines whether a signal indicating emission of the low beam is input from the light switch 51. When this signal is input to the control unit CO, the control unit CO advances the control flow to Step SP12. Meanwhile, when this signal is not input to the control unit CO, the control unit CO advances the control flow to Step SP13. For this reason, the determination of the control unit CO can be understood as changing the Step to proceed to the next in a case division manner according to the input signal.

(Step SP12)

In this Step, the control unit CO controls the light distribution pattern forming unit 12 of the first lamp unit 10 and the light source unit 22 of the second lamp unit 20 so that the low beam is emitted from the vehicle headlight 1 and the position of the elbow point EP of the light distribution pattern PL of the low beam is a position according to the steering angle of the vehicle 100. In the present embodiment, the control unit CO controls the light distribution pattern forming unit 12 of the first lamp unit 10 and the light source unit 22 of the second lamp unit 20 such that the position of the hot zone HZL together with the elbow point EP is a position according to the steering angle of the vehicle 100. Specifically, the control unit CO refers to the table stored in the memory ME based on a signal corresponding to the steering angle of the vehicle 100 output from the steering sensor 52. Then, the control unit CO adjusts power supplied from a power supply unit (not illustrated) to the plurality of light emitting elements 13 in the light distribution pattern forming unit 12 of the first lamp unit 10 to set the light amount of the light emitted from each light emitting element 13 to the light amount according to the steering angle. Therefore, light having the predetermined light distribution pattern P1 corresponding to the steering angle is emitted from the first lamp unit 10 toward the front of the vehicle 100. In addition, the control unit CO causes the light source unit 22 of the second lamp unit 20 to supply predetermined power from the power supply unit (not illustrated), and causes the light source unit 22 to emit light. Therefore, light having the specific light distribution pattern P2 illustrated in FIG. 11 is emitted from the second lamp unit 20. Then, the light distribution pattern of the low beam corresponding to the steering angle of the vehicle 100 is formed by the light from the first lamp unit 10 and the light from the second lamp unit 20, and the control unit CO returns the control flow to Step SP11.

In the present embodiment, when the steering angle is equal to or less than the reference angle, the control unit CO adjusts the light amount of the light emitted from the plurality of light emitting elements 13 in the light distribution pattern forming unit 12 of the first lamp unit 10 so as to form the light distribution pattern PL of the low beam illustrated in FIG. 9. This reference angle is, for example, 5°. When the steering angle is a leftward steering angle exceeding the reference angle, the control unit CO adjusts the light amount of the light emitted from the plurality of light emitting elements 13, and sets the predetermined light distribution pattern P1 emitted from the first lamp unit 10 to a light distribution pattern in which the positions of the elbow point EP and the hot zone HZL are shifted leftward by a predetermined distance according to the steering angle from the position illustrated in FIG. 9. Moreover, when the steering angle is a rightward steering angle exceeding the reference angle, the control unit CO adjusts the light amounts of the light emitted from the plurality of light emitting elements 13, and sets the predetermined light distribution pattern P1 emitted from the first lamp unit 10 to a light distribution pattern in which the positions of the elbow point EP and the hot zone HZL are shifted rightward by a predetermined distance according to the steering angle from the position illustrated in FIG. 9. The predetermined distance corresponding to the steering angle is short when the steering angle is small, and is long when the steering angle is large. In the present embodiment, the predetermined distance increases stepwise as the steering angle increases. That is, the table stored in the memory ME is a table in which the predetermined distance is as described above. Therefore, the control unit CO changes the predetermined light distribution pattern P1 by adjusting the light amount of the light emitted from the plurality of light emitting elements 13 on the basis of such a table, and moves the elbow point EP and the hot zone HZL of the light distribution pattern PL of the low beam in the left-right direction according to the steering angle of the vehicle 100. Note that the predetermined distance may gradually increase as the steering angle increases.

Figure 14:
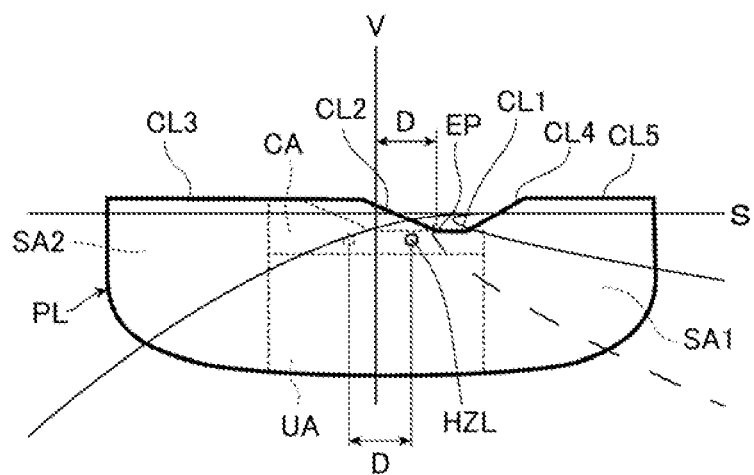
FIG. 14 is a diagram illustrating an example of a state in which an elbow point and a hot zone of the light distribution pattern of the low beam are moved according to a steering angle of a vehicle.

FIG. 14 is a diagram illustrating an example of a state in which the elbow point EP and the hot zone HZL of the light distribution pattern PL of the low beam are moved according to the steering angle of the vehicle 100. In FIG. 14, the elbow point EP and the hot zone HZL of the light distribution pattern in the low beam illustrated in FIG. 9 are indicated by broken lines. The state illustrated in FIG. 14 is a state in which the steering angle of the vehicle is a rightward steering angle exceeding the reference angle. Therefore, in the present embodiment, in Step SP12, the positions of the elbow point EP and the hot zone HZL of the light distribution pattern PL of the low beam are changed to positions shifted rightward by a predetermined distance D. The positions of the elbow point EP and the hot zone HZL in the vertical direction are substantially the same before and after the movement. In addition, the cutoff line CL2 which is the inclined cutoff line also moves to the right side. The inclination angle of the cutoff line CL2 with respect to the horizontal direction is substantially the same before and after the movement.

Figure 15A:
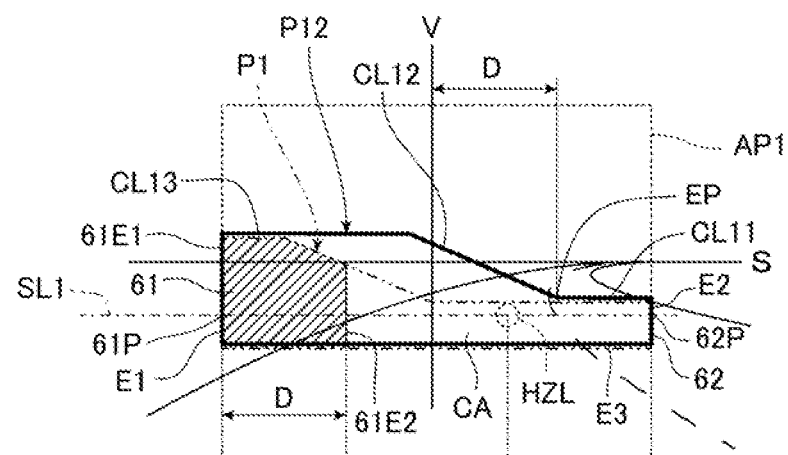
FIG. 15A is a diagram illustrating a predetermined light distribution pattern of light emitted from the first lamp unit when the light distribution pattern of the low beam illustrated in FIG. 14 is formed.
Figure 15B:
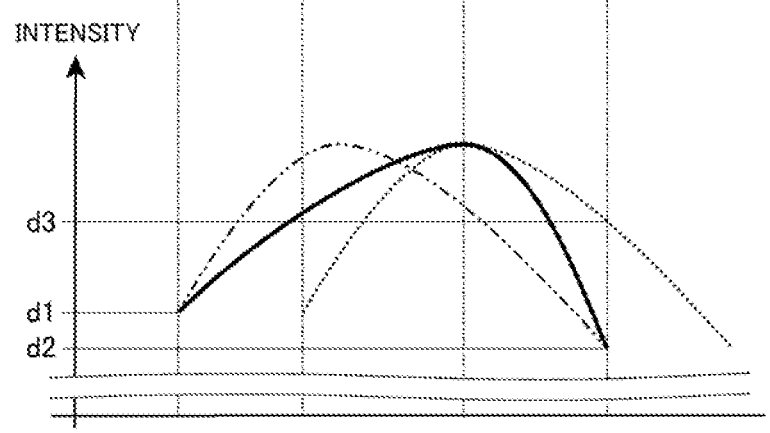
FIG. 15B is a diagram illustrating an intensity distribution of light in the light distribution pattern.

FIG. 15A is a diagram illustrating a predetermined light distribution pattern of light emitted from the first lamp unit 10 when the light distribution pattern PL of the low beam illustrated in FIG. 14 is formed, and FIG. 15B is a diagram illustrating a light intensity distribution in the light distribution pattern. In FIG. 15A, S indicates a horizontal line, V indicates a vertical line passing through the center of the vehicle 100 in the left-right direction, and a predetermined light distribution pattern P12 of the light emitted from the first lamp unit 10 formed on a virtual vertical screen arranged 25 m ahead of the vehicle 100 is indicated by a thick line. In FIG. 15A, the position of the hot zone HZL in the light distribution pattern PL of the low beam illustrated in FIG. 14 is indicated by a dotted line, and the predetermined light distribution pattern P1 and the light intensity distribution of the predetermined light distribution pattern P1 illustrated in FIG. 10A and FIG. 10B are indicated by two-dot chain lines. The predetermined light distribution pattern P1 is slightly shifted downward for easy understanding. Similarly to the light intensity distribution illustrated in FIG. 10B, the light intensity distribution illustrated in FIG. 15B is a distribution on a straight line SL1 passing through the hot zone HZL and extending in the left-right direction, and is indicated by a thick line. The straight line SL1 is parallel to the horizontal direction.

As described above, the predetermined region CA in the first state before the elbow point EP and the hot zone HZL move is the outer edge of the predetermined light distribution pattern P1 illustrated in FIG. 10A and the region inside the outer edge. In FIG. 15A, the fixed region 61 based on the predetermined region CA in the first state is hatched. The fixed region 61 is a region that coincides with a range from an edge on a side opposite to the predetermined side to a position away from the predetermined side by a predetermined distance D in the predetermined region CA in the first state. In the example illustrated in FIG. 15A, since the elbow point EP and the hot zone HZL move rightward by the predetermined distance D, the predetermined side in the left-right direction is the right side. Therefore, the fixed region 61 is a region that coincides with a range from the left edge E1 to a position away to the right by the predetermined distance D in the predetermined region CA in the first state. In the first state, the left edge E1 of the predetermined region CA and the left edge 61E1 of the fixed region 61 are the same. In addition, the predetermined region CA in the second state after the elbow point EP and the hot zone HZL move by the predetermined distance D is an outer edge of the predetermined light distribution pattern P12 illustrated in FIG. 15A in which the elbow point EP and the hot zone HZL are changed to move and a region inside the outer edge. The fixed region 61 and the right edge E2 of the predetermined region CA in the first state are located in the predetermined region CA in the second state. In the present embodiment, when changing from the first state to the second state, the positions of the left edge E1, the right edge E2, and the lower edge E3 of the predetermined region CA do not change. Therefore, in the second state, similarly to the first state, a part of the predetermined light distribution pattern P12 and a part of the specific light distribution pattern P2 overlap each other.

The intensity of the light from the first lamp unit 10 in the second state in the fixed region 61 is equal to or less than the intensity of the light from the first lamp unit 10 in the first state in the fixed region 61. Specifically, the intensity of the light from the first lamp unit 10 in the second state at an arbitrary point in the fixed region 61 is equal to or less than the intensity of the light from the first lamp unit 10 in the first state at this arbitrary point. In addition, the intensity of the light from the first lamp unit 10 in the second state at an arbitrary point in the fixed region 61 is equal to or more than the intensity of the light from the first lamp unit 10 in the first state at the intersection of the straight line passing through the arbitrary point and extending in the left-right direction and the left edge 61E1 of the fixed region 61. For example, when this arbitrary point is located on the straight line SL1, the intensity of the light from the first lamp unit 10 in the second state at the arbitrary point is equal to or more than the intensity d1 of the light from the first lamp unit 10 in the first state at an intersection point 61P of the straight line SL1 and the edge 61E1.

In addition, the intensity of the light from the first lamp unit 10 in the second state at an arbitrary reference point on the reference line 62 coincident with the right edge E2 of the predetermined region CA in the first state is equal to or more than the intensity of the light from the first lamp unit 10 in the first state at this arbitrary reference point. For example, when this arbitrary reference point is an intersection point 62P of the straight line SL1 and the reference line 62, the intensity of light from the first lamp unit 10 in the second state at this intersection point 62P is equal to or more than the intensity d2 of light from the first lamp unit 10 in the first state at this intersection point 62P. In addition, the intensity of the light from the first lamp unit 10 in the second state at an arbitrary reference point on the reference line 62 is equal to or less than the intensity of the light from the first lamp unit 10 at this arbitrary reference point in a case where the predetermined light distribution pattern P1 in the first state moves rightward by a predetermined distance D. For example, when this arbitrary reference point is an intersection point 62P of the straight line SL1 and the reference line 62, the intensity of the light from the first lamp unit 10 in the second state at the intersection point 62P is equal to or less than the intensity d3 of the light from the first lamp unit 10 at the intersection point 62P when the predetermined light distribution pattern P1 in the first state moves rightward by the predetermined distance D.

In the present embodiment, the intensity of the light from the first lamp unit 10 in the second state at an arbitrary point on the left edge 61E1 of the fixed region 61 is the same as the intensity of the light from the first lamp unit 10 in the first state at the arbitrary point. In addition, the intensity of light from the first lamp unit 10 in the second state at an arbitrary reference point on the reference line 62 is the same as the intensity of light from the first lamp unit 10 in the first state at this arbitrary reference point. The intensity of the light from the first lamp unit 10 in the second state gradually increases from the left edge 61E1 of the fixed region 61 toward the hot zone HZL. However, the intensity of light from the first lamp unit 10 may increase stepwise from the edge 61E1 toward the hot zone HZL. The intensity of the light from the first lamp unit 10 in the second state gradually increases from the reference line 62 toward the hot zone HZL. However, the intensity of light from the first lamp unit 10 may increase stepwise from the reference line 62 toward the hot zone HZL. Further, the intensity d1 of the light from the first lamp unit 10 in the first state at the intersection point 61P is higher than the intensity d2 of the light from the first lamp unit 10 in the first state at the intersection point 62P, but is not particularly limited.

The control unit CO adjusts the light amount of the light emitted from the plurality of light emitting elements 13 of the light distribution pattern forming unit 12 such that the outer shape, the position, and the light intensity distribution of the predetermined light distribution pattern P12 in the second state become as described above.

(Step SP13)

In this Step, the control unit CO determines whether or not a signal indicating emission of a high beam is input from the light switch 51. When this signal is input to the control unit CO, the control unit CO advances the control flow to Step SP14. Meanwhile, when this signal is not input to the control unit CO, the control unit CO advances the control flow to Step SP15.

(Step SP14)

In this Step, the control unit CO controls the light distribution pattern forming unit 12 of the first lamp unit 10, the light source unit 22 of the second lamp unit 20, and the light distribution pattern forming unit 32 of the third lamp unit 30 so that a high beam is emitted from the vehicle headlight 1. Specifically, the control unit CO causes the light source unit 22 of the second lamp unit 20 to emit light, and causes the plurality of light emitting elements 33a to 33e in the light distribution pattern forming unit 32 of the third lamp unit to emit light. In addition, the control unit CO changes the light amount of the light emitted from each of the plurality of light emitting elements 13 in the light distribution pattern forming unit 12 of the first lamp unit 10 to the amount of light corresponding to the high beam. Then, the light distribution pattern of the high beam is formed by the light from the first lamp unit 10, the light from the second lamp unit 20, and the light from the third lamp unit 30, and the control unit CO returns the control flow to Step SP11.

(Step SP15)

In this Step, no signal is input from the light switch 51 to the control unit CO. Therefore, non-emission of the low beam and the high beam is selected in the light switch 51. The control unit CO controls the light distribution pattern forming unit 12 of the first lamp unit 10, the light source unit 22 of the second lamp unit 20, and the light distribution pattern forming unit 32 of the third lamp unit 30 so that the light from the first lamp unit 10, the second lamp unit 20, and the third lamp unit 30 does not exit. Specifically, the control unit CO does not emit light from the plurality of light emitting elements 13 in the light distribution pattern forming unit 12 of the first lamp unit 10, the light source unit 22 of the second lamp unit 20, and the plurality of light emitting elements 33a to 33e in the light distribution pattern forming unit 32 of the third lamp unit 30, and returns the control flow to Step SP11.

As described above, in the vehicle headlight 1 of the present embodiment, the elbow point EP and the hot zone HZL of the light distribution pattern PL of the low beam move in the left-right direction according to the steering angle of the vehicle 100. Note that the control flow of the control unit CO is not particularly limited. In addition, the vehicle headlight 1 may move the hot zone HZH in the light distribution pattern PH of the high beam in the left-right direction according to the steering angle of the vehicle 100. In addition, the vehicle headlight 1 may not move the elbow point EP and the hot zone HZL of the light distribution pattern PL of the low beam according to the steering angle of the vehicle 100, and may not move the hot zone HZH in the light distribution pattern PH of the high beam according to the steering angle of the vehicle 100.

As described above, the vehicle headlight 1 of the present embodiment includes the first lamp unit 10 and the second lamp unit 20. The first lamp unit 10 includes the light distribution pattern forming unit 12 in which the plurality of light emitting elements 13 as light emitting units capable of individually changing the light amount of the light emitted are arranged in a matrix and a predetermined light distribution pattern corresponding to the light amount of the light emitted from the plurality of light emitting elements 13 is formed. The second lamp unit 20 emits light having a specific light distribution pattern P2. In addition, the light distribution pattern PL of the low beam is formed by the light emitted from the first lamp unit 10 and the light emitted from the second lamp unit 20. The light distribution pattern PL of the low beam has the cutoff line CL1 which is the horizontal cutoff line extending in the horizontal direction from the elbow point EP to one side in the left-right direction, and the cutoff line CL2 which is the inclined cutoff line extending obliquely upward from the elbow point EP to the other side in the left-right direction. In the light distribution pattern PL of the low beam, the elbow point EP is included in the predetermined region CA formed by the light including the light from the first lamp unit 10. Therefore, the vehicle headlight 1 of the present embodiment can finely adjust the intensity distribution of the light in the predetermined region CA by adjusting the light amount of the light emitted from each light emitting element 13 in the first lamp unit 10. In the light distribution pattern PL of the low beam, the first side region SA1 and the second side region SA2 sandwiching the predetermined region CA in the left-right direction are formed by the light emitted from the second lamp unit 20. Here, the first side region SA1 and the second side region SA2 have a smaller change rate in light intensity than the predetermined region CA. The light intensity distribution in the first side region SA1 and the second side region SA2 is not required to be finely adjusted as compared with the predetermined region CA. Therefore, the second lamp unit 20 may not be able to finely adjust the intensity distribution of the light in the specific light distribution pattern P2 to be emitted as compared with the first lamp unit 10. In the present embodiment, the second lamp unit 20 includes the light source unit 22 that emits light and the shade 23, and forms the specific light distribution pattern P2 by blocking a part of the light emitted from the light source unit 22 with the shade 23. The second lamp unit 20 having such a configuration has a simpler configuration than the first lamp unit 10 having the light distribution pattern forming unit 12. Therefore, the vehicle headlight 1 of the present embodiment can reduce the manufacturing cost as compared with the case where the light distribution pattern PL of the low beam is formed only by the light emitted from the first lamp unit 10.

In the vehicle headlight 1 of the present embodiment, a part of the predetermined light distribution pattern P1 and a part of the specific light distribution pattern P2 overlap each other. Therefore, it is possible to suppress the occurrence of an unintended dark region in the light distribution pattern PL of the low beam.

In the vehicle headlight 1 of the present embodiment, the cutoff lines CL4 and CL5, which are the upper edges in the first side region SA1, are located above the cutoff line CL1, which is the horizontal cutoff line. Therefore, the visibility on one side in the left-right direction can be improved as compared with the case where the upper edge in the first side region SA1 is located below the cutoff line CL1. From the viewpoint of improving the visibility on one side in the left-right direction, at least a part of the upper edge in the first side region SA1 may be located above the cutoff line CL1.

In the vehicle headlight 1 of the present embodiment, the cutoff line CL3 which is the upper edge in the second side region SA2 is located above the cutoff line CL1 which is the horizontal cutoff line. Therefore, the visibility on the right side and the left side can be improved as compared with the case where the upper edges of the first side region SA1 and the second side region SA2 are located below the cutoff line CL1. From the viewpoint of improving the visibility on the other side in the left-right direction, at least a part of the upper edge in the second side region SA2 may be located above the cutoff line CL1.

The vehicle headlight 1 of the present embodiment further includes the control unit CO, and the predetermined region CA includes the elbow point and the hot zone HZL. The control unit CO adjusts the light amount of the light emitted from the plurality of light emitting elements 13, and changes the predetermined light distribution pattern P1 to the light distribution pattern in which the elbow point EP and the hot zone HZL move to a predetermined side in the left-right direction by a predetermined distance D. Therefore, according to the vehicle headlight 1 of the present embodiment, the elbow point EP and the hot zone HZL can be moved in the left-right direction according to the change in the traveling direction of the vehicle 100, and the visibility in the traveling direction can be improved. In addition, in the vehicle headlight 1 of the present embodiment, for example, when the elbow point EP and the hot zone HZL move rightward by the predetermined distance D, the fixed region 61 is a region that coincides with a range to a position separated rightward by the predetermined distance D from the left edge E1 of the predetermined region CA in the first state before the elbow point EP and the hot zone HZL move. The intensity of the light from the first lamp unit 10 in the second state after the elbow point EP and the hot zone HZL at an arbitrary point in the fixed region 61 move is equal to or less than the intensity of the light from the first lamp unit 10 in the first state at the arbitrary point and equal to or more than the intensity of the light from the first lamp unit 10 in the first state at the intersection of the straight line passing through the arbitrary point and extending in the left-right direction and the left edge 61E1 of the fixed region 61. For example, when the elbow point EP and the hot zone HZL are moved in the left-right direction by moving the predetermined light distribution pattern P1 in the left-right direction, the fixed region 61 is not irradiated with the light from the first lamp unit 10. Therefore, according to the vehicle headlight 1 of the present embodiment, the amount of change in the light intensity in the fixed region 61 can be reduced as compared with the above case, and a driver can be prevented from feeling uncomfortable in the fixed region 61. Therefore, according to the vehicle headlight 1 of the present embodiment, it is possible to prevent the driver from feeling uncomfortable when the elbow point EP and the hot zone HZL are moved, as compared with the above case. From the viewpoint of finely adjusting the light intensity distribution in the predetermined region CA and reducing the manufacturing cost, the light intensity from the first lamp unit 10 in the second state at an arbitrary point in the fixed region 61 is not particularly limited. For example, when the elbow point EP and the hot zone HZL move rightward by a predetermined distance D, the intensity of the light from the first lamp unit 10 in the second state at an arbitrary point in the fixed region 61 may exceed the intensity of the light from the first lamp unit 10 in the first state at the arbitrary point. The intensity of the light may be less than the intensity of the light from the first lamp unit 10 in the first state at the intersection of the straight line passing through the arbitrary point and extending in the left-right direction and the left edge 61E1 of the fixed region 61.

In the vehicle headlight 1 of the present embodiment, the right edge E2 of the predetermined region CA in the first state is located in the predetermined region CA in the second state. In addition, the intensity of the light from the first lamp unit 10 in the second state at an arbitrary reference point on the reference line 62 coinciding with the edge E2 is equal to or more than the intensity of the light from the first lamp unit 10 in the first state at the arbitrary reference point and equal to or lower than the intensity of the light from the first lamp unit 10 at the arbitrary reference point in the case where the predetermined light distribution pattern P1 in the first state moves rightward by the predetermined distance D. Therefore, according to the vehicle headlight 1 of the present embodiment, as compared with the case where the elbow point EP and the hot zone HZL are moved in the left-right direction by moving the predetermined light distribution pattern P1 in the left-right direction, the amount of change in the intensity of light on the reference line 62 can be prevented from increasing, and it is possible to prevent the driver from easily feeling uncomfortable about the change in the light amount on the reference line 62.

In the vehicle headlight 1 of the present embodiment, the intensity of light from the first lamp unit 10 in the second state gradually increases from the left edge 61E1 of the fixed region 61 toward the hot zone HZL. Therefore, according to the vehicle headlight 1 of the present embodiment, it is possible to further suppress the driver from feeling uncomfortable when the elbow point EP and the hot zone HZL are moved.

In the vehicle headlight 1 of the present embodiment, the intensity of light from the first lamp unit 10 in the second state at the arbitrary reference point on the reference line 62 is the same as the intensity of light from the first lamp unit 10 in the first state at the arbitrary reference point. Therefore, according to the vehicle headlight 1 of the present embodiment, the intensity of the light from the first lamp unit 10 does not change when the elbow point EP and the hot zone HZL are moved on the reference line 62, and thus, it is possible to further prevent the driver from feeling uncomfortable.

In the vehicle headlight 1 of the present embodiment, the intensity of light from the first lamp unit 10 in the second state gradually increases from the reference line 62 toward the hot zone HZL. Therefore, it is possible to further prevent the driver from feeling uncomfortable when the elbow point EP and the hot zone HZL are moved.

Second Embodiment

Next, a second embodiment of the present invention will be described in detail with reference to FIG. 16A and FIG. 16B. Note that the same or equivalent components as those of the first embodiment are denoted by the same reference numerals, and redundant description will be omitted unless otherwise specified.

Figure 16A:
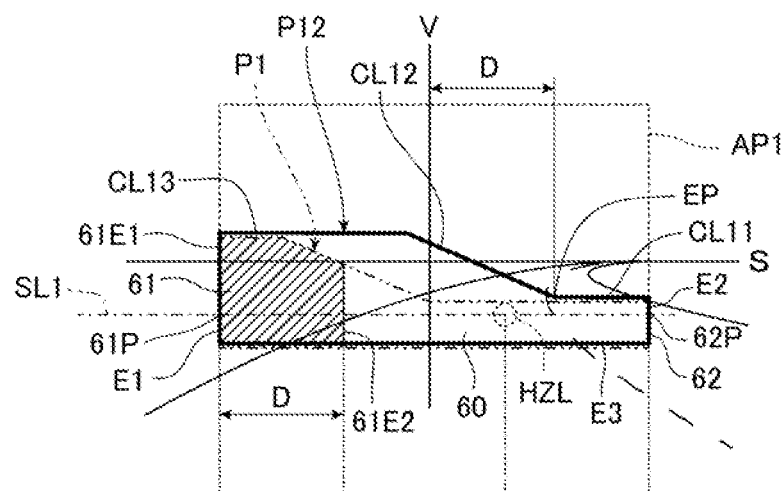
FIG. 16A is a diagram illustrating a predetermined light distribution pattern of light emitted from a first lamp unit of a second embodiment when the light distribution pattern of the low beam illustrated in FIG. 14 is formed.
Figure 16B:
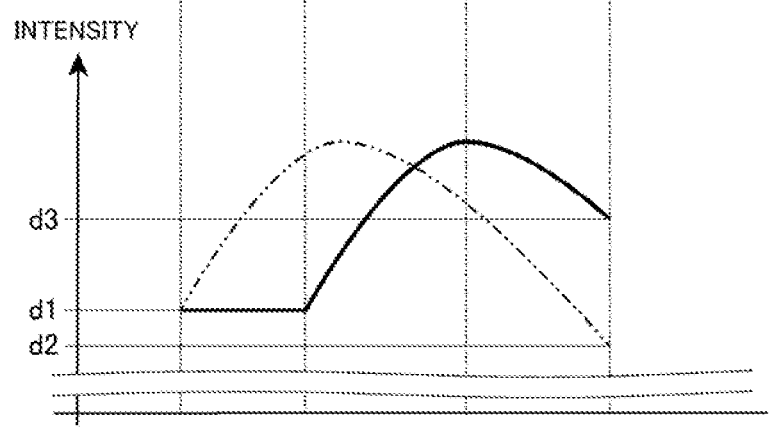
FIG. 16B is a diagram illustrating an intensity distribution of light in the light distribution pattern, by a method similar to that in FIG. 15A and FIG. 15B.

FIG. 16A is a diagram illustrating a predetermined light distribution pattern of light emitted from the first lamp unit of the present embodiment when forming the light distribution pattern of the low beam illustrated in FIG. 14, and FIG. 16B is a diagram illustrating an intensity distribution of light in the light distribution pattern, by a method similar to that in FIG. 15A and FIG. 15B. The predetermined light distribution pattern P12 illustrated in FIG. 16A is a predetermined light distribution pattern of the light emitted from the first lamp unit 10 when the light distribution pattern PL of the low beam in which the elbow point EP and the hot zone HZL are moved according to the steering angle of the vehicle 100 is formed. In the present embodiment, the light intensity distribution in the predetermined light distribution pattern P12 is different from the light intensity distribution in the predetermined light distribution pattern P12 in the first embodiment. Therefore, the light intensity distribution in the light distribution pattern PL of the low beam of the present embodiment is different from the light intensity distribution in the light distribution pattern PL of the low beam of the first embodiment. Note that the outer shape of the predetermined light distribution pattern P12 of the present embodiment and the positions of the elbow point EP and the hot zone HZL of the light distribution pattern PL of the low beam are the same as those of the first embodiment.

As illustrated in FIG. 16B, in the present embodiment, the intensity of the light from the first lamp unit 10 in the second state at an arbitrary point in the fixed region 61 is the same as the intensity of the light from the first lamp unit 10 in the first state at the intersection of the straight line passing through the arbitrary point and extending in the left-right direction and the left edge 61E1 of the fixed region 61. For example, when this arbitrary point is located on the straight line SL1, the intensity is the same as the intensity d1 of the light from the first lamp unit 10 in the first state at the intersection point 61P between the straight line SL1 and the edge 61E1. Therefore, according to the vehicle headlight 1 of the present embodiment, as in the first embodiment, it is possible to prevent the driver from feeling uncomfortable when the elbow point EP and the hot zone HZL are moved. In addition, according to the vehicle headlight 1 of the present embodiment, the intensity of light from the first lamp unit 10 in the second state in the fixed region 61 is constant in the left-right direction, and it is possible to simplify the adjustment of the light amount of the light emitted from the plurality of light emitting elements 13 by the control unit CO.

In the vehicle headlight 1 of the present embodiment, the intensity of light from the first lamp unit 10 in the second state gradually increases from a right edge 61E2 of the fixed region 61 toward the hot zone HZL. Therefore, it is possible to further prevent the driver from feeling uncomfortable when the elbow point EP and the hot zone HZL are moved.

In the present embodiment, the intensity distribution of the light from the first lamp unit 10 in the second state in the range from the right edge 61E2 of the fixed region 61 to the reference line 62 is the same as the intensity distribution in the range when the predetermined light distribution pattern P1 in the first state moves rightward by the predetermined distance D. Therefore, according to the vehicle headlight 1 of the present embodiment, the adjustment of the light amount of the light emitted from the plurality of light emitting elements 13 by the control unit CO can be simplified as compared with the case where the light intensity distribution in the second state in the range is different from the light intensity distribution in the range when the predetermined light distribution pattern P1 in the first state is moved rightward by the predetermined distance D.

Although the present invention has been described by taking the above-described embodiment as an example, the present invention is not limited thereto.

For example, in the above embodiment, the light distribution pattern PL of the low beam having the cutoff line CL1 as the horizontal cutoff line, the CL2 as the inclined cutoff line, and the cutoff lines CL3, CL4, and CL5 at the upper edge has been described as an example. However, the light distribution pattern PL of the low beam may have the cutoff line CL1 as the horizontal cutoff line and the CL2 as the inclined cutoff line, and may be, for example, a light distribution pattern illustrated in FIG. 17.

Figure 17:
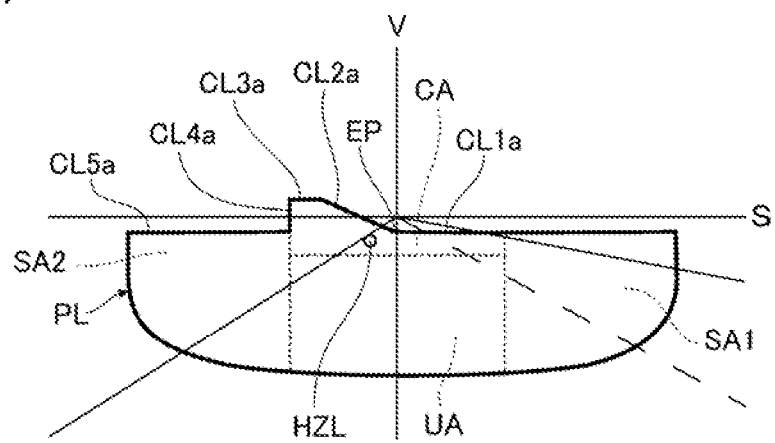
FIG. 17 is a diagram illustrating a light distribution pattern of a low beam according to a first modification.

FIG. 17 is a diagram illustrating a light distribution pattern of a low beam according to a first modification; In FIG. 17, S indicates a horizontal line, V indicates a vertical line passing through the center of the vehicle 100 in the left-right direction, and a light distribution pattern PL of a low beam formed on a virtual vertical screen arranged 25 m ahead of the vehicle 100 is indicated by a thick line. The upper edge of the light distribution pattern PL of the low beam in the present modification is different from the upper edge of the light distribution pattern PL of the low beam in the above embodiment. The light distribution pattern PL of the low beam in the present modification has, at the upper edge, a cutoff line CL1$a$ as the horizontal cutoff line, a CL2$a$ as the inclined cutoff line, and cutoff lines CL3$a$, CL4$a$, and CL5$a$. Since the cutoff lines CL1$a$ and CL2$a$ are the same as the cutoff lines CL1 and CL2 in the above embodiment, the descriptions of the cutoff lines CL1$a$ and CL2$a$ will be omitted. The cutoff line CL3$a$ extends in the horizontal direction from an end of the cutoff line CL2$a$ on a side opposite to the elbow point EP side to the other side in the left-right direction. The cutoff line CL4$a$ extends downward from an end of the cutoff line CL3$a$ on the side opposite to the elbow point EP side. An end of the cutoff line CL4$a$ on the side opposite to the cutoff line CL3$a$ side is located below the horizontal line S. The cutoff line CL5$a$ extends in the horizontal direction from an end of the cutoff line CL4$a$ on the side opposite to the cutoff line CL3$a$ side to the other side in the left-right direction. The cutoff line CL5$a$ and the cutoff line CL1$a$ are located at substantially the same height.

The upper edge of the predetermined region CA in the light distribution pattern PL of the low beam is a part of the cutoff line CL1$a$, the cutoff line CL2$a$, and the cutoff line CL3$a$. The upper edge of the first side region SA1 is another part of the cutoff line CL1$a$, and the upper edge of the second side region SA2 is the cutoff line CL5$a$.

Figure 18:
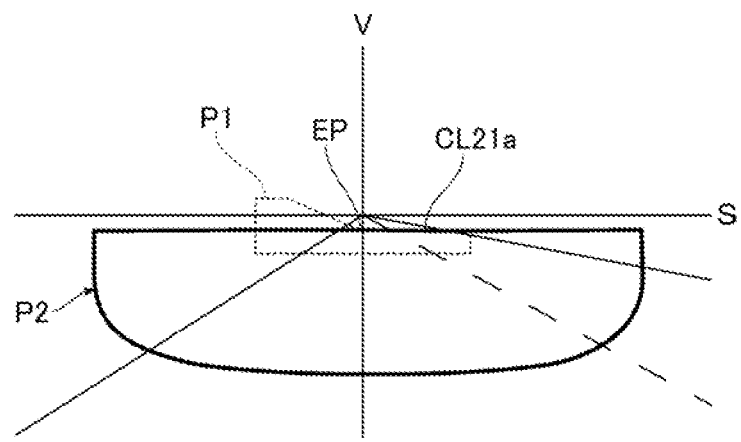
FIG. 18 is a diagram illustrating a specific light distribution pattern of light emitted from a second lamp unit according to the first modification.

Such a light distribution pattern PL of the low beam is formed, for example, by setting the light distribution pattern of the light emitted from the second lamp unit 20 to a specific light distribution pattern illustrated in FIG. 18. FIG. 18 is a diagram illustrating a specific light distribution pattern of light emitted from the second lamp unit 20 according to the first modification. In FIG. 18, S indicates a horizontal line, V indicates a vertical line passing through the center of the vehicle 100 in the left-right direction, and a specific light distribution pattern P2 formed on a virtual vertical screen arranged 25 m ahead of the vehicle 100 is indicated by a thick line. In FIG. 18, a predetermined light distribution pattern P1 emitted from the first lamp unit 10 is indicated by a dotted line, and the predetermined light distribution pattern P1 is the same as the predetermined light distribution pattern P1 in the above embodiment.

An upper edge of the specific light distribution pattern P2 in the present modification is different from the upper edge of the specific light distribution pattern P2 in the above embodiment, and includes a cutoff line CL21$a$ extending linearly in the horizontal direction. A part of the specific light distribution pattern P2 and a part of the predetermined light distribution pattern P1 overlap each other. Specifically, the cutoff line CL21$a$ in the specific light distribution pattern P2 crosses the predetermined light distribution pattern P1 in the left-right direction and overlaps the cutoff line CL11 in the predetermined light distribution pattern P1. A region below the cutoff line CL11 in the predetermined light distribution pattern P1 overlaps a part of the specific light distribution pattern P2. Then, the light distribution pattern PL of the low beam illustrated in FIG. 17 is formed by the light having the predetermined light distribution pattern P1 and the light having the specific light distribution pattern P2. The predetermined region CA in the present modification includes the hot zone HZL together with the elbow point EP as in the above embodiment. The predetermined region CA is a region formed by the light including the light emitted from the first lamp unit 10 as described above, and the outer shape of the predetermined region CA and the outer shape of the predetermined light distribution pattern P1 coincide with each other. The cutoff line CL21$a$ in the specific light distribution pattern P2 forms the cutoff lines CL1$a$ and CL5a in the light distribution pattern PL of the low beam. The specific light distribution pattern P2 in the present modification can be formed, for example, by not forming the protrusion 23c in the light shielding portion 23a of the shade 23 of the above embodiment.

In the present modification, as described above, a part of the predetermined light distribution pattern P1 and a part of the specific light distribution pattern P2 overlap each other, and the cutoff line CL21a, which is the upper edge of the specific light distribution pattern P2, extends linearly in the horizontal direction and crosses the predetermined light distribution pattern P1. For this reason, the upper edge in the region where a part of the predetermined light distribution pattern P1 and a part of the specific light distribution pattern P2 overlap each other has a linear shape extending in the horizontal direction. Therefore, as compared with a case where the upper edge in the overlapping region has a curved shape, for example, it is possible to suppress complication of adjustment of the light amount of the light emitted from the light emitting element 13 as the light emitting unit of the light distribution pattern forming unit 12. From the viewpoint of suppressing the complexity of the adjustment of the light amount, it is sufficient that a part of the predetermined light distribution pattern P1 and a part of the specific light distribution pattern P2 overlap each other, and a part of the upper edge in the specific light distribution pattern P2 extends linearly in the horizontal direction and crosses the predetermined light distribution pattern P1.

In the above embodiment, the specific light distribution pattern P2 having the first region A1, the second region A2, and the third region has been described as an example. However, the specific light distribution pattern is not particularly limited. It is sufficient that the light distribution pattern of the low beam having the horizontal cutoff line and the inclined cutoff line can be formed by the light having the predetermined light distribution pattern emitted from the first lamp unit 10 and the light having the specific light distribution pattern from the second lamp unit 20. For example, the specific light distribution pattern may be the light distribution pattern illustrated in FIG. 19.

Figure 19:
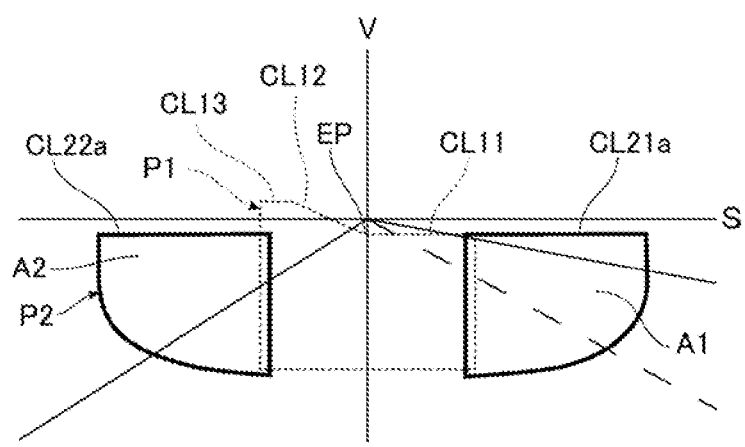
FIG. 19 is a diagram illustrating a specific light distribution pattern of light emitted from a second lamp unit according to a second modification.

FIG. 19 is a diagram illustrating a specific light distribution pattern of light emitted from the second lamp unit 20 according to the second modification. In FIG. 19, S indicates a horizontal line, V indicates a vertical line passing through the center of the vehicle 100 in the left-right direction, and a specific light distribution pattern P2 formed on a virtual vertical screen arranged 25 m ahead of the vehicle 100 is indicated by a thick line. In FIG. 19, a predetermined light distribution pattern P1 emitted from the first lamp unit 10 in the present modification is indicated by a dotted line. The predetermined light distribution pattern P1 is mainly different from the predetermined light distribution pattern P1 in the above embodiment in that the lower edge is located lower. Therefore, the predetermined light distribution pattern P1 of the present modification has cutoff lines CL11, CL12, and CL13 at the upper edge, similarly to the predetermined light distribution pattern P1 in the above embodiment. The horizontal cutoff line in the light distribution pattern of the low beam is formed by the cutoff line CL11, and the inclined cutoff line in the light distribution pattern of the low beam is formed by the cutoff line CL12.

The specific light distribution pattern P2 in the present modification includes the first region A1 located on one side in the left-right direction and the second region A2 located on the other side in the left-right direction and separated from the first region A1. The upper edge of the first region A1 includes the cutoff line CL21a extending linearly in the horizontal direction, and the upper edge of the second region A2 includes the cutoff line CL22a extending linearly in the horizontal direction. The cutoff line CL21a and the cutoff line CL22a are located at substantially the same height as the cutoff line CL11 of the predetermined light distribution pattern P1. A part of the specific light distribution pattern P2 and a part of the predetermined light distribution pattern P1 overlap each other. Specifically, the other side of the specific light distribution pattern P2 in the first region A1 overlaps one side of the predetermined light distribution pattern P1, and the one side of the specific light distribution pattern P2 in the second region A2 overlaps the other side of the predetermined light distribution pattern P1. Then, similarly to the light distribution pattern PL of the low beam illustrated in FIG. 17, the light distribution pattern of the low beam having the horizontal cutoff line and the inclined cutoff line is formed by the light having the predetermined light distribution pattern P1 and the light having the specific light distribution pattern P2. In addition, the predetermined region in the present modification includes the hot zone HZL together with the elbow point EP as in the above-described embodiment. As described above, the predetermined region CA is a region irradiated with the light emitted from the first lamp unit 10, and the outer shape of the predetermined region CA and the outer shape of the predetermined light distribution pattern P1 coincide with each other. A part of the first region A1 in the specific light distribution pattern P2 is a first side region in the light distribution pattern of the low beam, and a part of the second region A2 in the specific light distribution pattern P2 is a second side region in the light distribution pattern of the low beam. The specific light distribution pattern P2 in the present modification can be formed, for example, by forming the protrusion 23c of the light shielding portion 23a of the shade 23 of the above embodiment as a protrusion protruding downward in a linearly elongated rectangular shape and crossing the light emitting element 22a in a front view.

In the above embodiment, the predetermined region CA formed by the light emitted from the first lamp unit 10 and a part of the light emitted from the second lamp unit 20 has been described as an example. However, the predetermined region CA may be formed by light including light emitted from the first lamp unit 10, and the predetermined region CA may include the elbow point EP, and may be formed only by light emitted from the first lamp unit 10. In this case, in the above embodiment, a part of the outer edge of the predetermined light distribution pattern P1 and a part of the outer edge of the specific light distribution pattern P2 are in contact with each other, and the predetermined light distribution pattern P1 and the specific light distribution pattern P2 do not overlap each other. It is preferable that at least a part of the predetermined light distribution pattern and a part of the specific light distribution pattern overlap each other from the viewpoint of preventing an unintentionally darkened region from being formed in the light distribution pattern PL of the low beam. For example, in the above embodiment, the outer shape of the specific light distribution pattern P2 may coincide with the outer shape of the light distribution pattern PL of the low beam, and in this case, the entire predetermined light distribution pattern P1 and a part of the specific light distribution pattern P2 overlap each other.

In the above embodiment, the first lamp unit 10 including the light distribution pattern forming unit 12 in which the plurality of light emitting elements 13 capable of individually changing the light amount of the light emitted are arranged in a matrix and which forms the predetermined light distribution pattern according to the light amount of the light emitted from the plurality of light emitting elements 13 has been described as an example. However, the first lamp unit 10 only needs to include a light distribution pattern forming unit in which the plurality of light emitting units capable of individually changing the light amount of the light emitted are arranged in a matrix and which forms the predetermined light distribution pattern according to the light amount of the light emitted from the plurality of light emitting units, and may have a configuration as illustrated in FIG. 20, for example.

Figure 20:
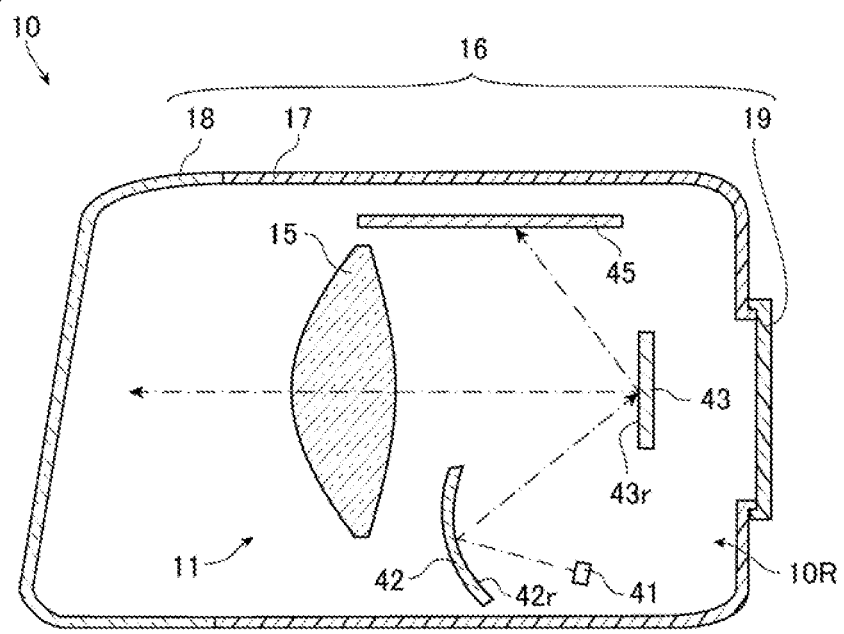
FIG. 20 is a view illustrating a first lamp unit according to a third modification from the same viewpoint as FIG. 2.

FIG. 20 is a view illustrating a first lamp unit according to a third modification from the same viewpoint as FIG. 2. As illustrated in FIG. 20, a first lamp unit 10 of the present modification is mainly different from the first lamp unit 10 of the above embodiment in that the first emission unit 11 includes a light source 41, a reflector 42, a reflecting device 43, and a light absorbing plate 45 as main components instead of the light distribution pattern forming unit 12.

The light source 41 is a light emitting element that emits light. In the present modification, the light source 41 is disposed to emit light forward. Examples of the light source 41 include LEDs.

The reflector 42 is configured to reflect light emitted from the light source 41 by a reflecting surface 42r and irradiate a reflection control surface of the reflecting device 43 described later with the light. In the present modification, the reflector 42 is a curved plate-like member, and is disposed so as to cover the light source 41 from the front side. A surface of the reflector 42 on the light source 41 side is a reflecting surface 42r. The reflecting surface 42r is curved so as to be concave on the side opposite to the light source 41 side, and is configured, for example, to condense the light emitted from the light source 41 based on a spheroidal curved surface and irradiate the reflection control surface with the light.

The reflecting device 43 of the present modification is a so-called digital mirror device (DMD), has a reflection control surface 43r that reflects incident light, and is configured to be able to form a predetermined light distribution pattern by the light reflected by the reflection control surface 43r. The reflecting device 43 is disposed above the light source 41 and behind the reflector 42 such that the reflection control surface 43r faces the front side. The reflection control surface 43r is irradiated with light emitted from the light source 41 and reflected by the reflector 42. The reflection control surface 43r includes reflecting surfaces of a plurality of reflective elements arranged in a matrix, and these reflective elements are supported by the substrate so as to be individually tiltable. The plurality of reflective elements can be individually switched between a first tilted state in which light from the reflector 42 is reflected toward the projection lens 15 and a second tilted state in which light from the reflector 42 is reflected toward the light absorbing plate 45 described later. Such a reflecting device 43 can form a predetermined light distribution pattern by the light from the reflection control surface 43r toward the projection lens 15 by controlling the tilted state of the reflective element. In addition, by controlling the tilted state of these reflective elements over time, the intensity distribution of light of a predetermined light distribution pattern can be set to a desired intensity distribution. That is, it can be understood that the plurality of reflective elements of the reflecting device 43 are arranged in a matrix in which the light amount of the light emitted in the direction toward the projection lens 15 can be individually changed, and the reflecting device 43 forms a predetermined light distribution pattern according to the light amount of the light emitted from the reflecting surfaces of the plurality of reflective elements.

The light absorbing plate 45 is a plate-like member having a light absorbing property, and is configured to convert most of incident light into heat. In the present modification, the light absorbing plate 45 is disposed in front of and above the reflecting device 43, and light traveling from the reflection control surface 43r toward the light absorbing plate 45 enters the light absorbing plate 45, and most of the light is converted into heat. Examples of the light absorbing plate 45 include a plate-like member made of metal such as aluminum and having a surface subjected to black alumite processing or the like.

Even with such a configuration of the first lamp unit 10, similarly to the above embodiment, the light intensity distribution in the predetermined region CA including the elbow point EP in the light distribution pattern PL of the low beam can be finely adjusted, and the manufacturing cost can be reduced. Although not described, the light distribution pattern forming unit may be, for example, a liquid crystal on silicon (LCOS) or a diffraction grating that diffracts incident light to emit light of a predetermined light distribution pattern.

In the above embodiment, the second lamp unit 20 including the light source unit 22 that emits light and the shade 23 that blocks a part of the light emitted from the light source unit 22 has been described as an example. However, it is sufficient that the second lamp unit 20 can emit light having a specific light distribution pattern, and the configuration of the second lamp unit 20 is not particularly limited. The second lamp unit 20 may be, for example, a parabolic lamp.

In the above embodiment, the vehicle headlight 1 including the third lamp unit 30 has been described as an example. However, the vehicle headlight 1 may not include the third lamp unit 30. The configuration of the third lamp unit 30 is not particularly limited. The third lamp unit 30 may be, for example, a parabolic lamp unit or a direct lens lamp unit, or may have a configuration in which the light distribution pattern of the emitted light cannot be changed.

In the above embodiment, the lamp units 10, 20, and 30 each including the housings 16, 26, and 36 have been described as an example. However, these lamp units 10, 20, and 30 may share one housing, and the emission units 11, 21, and 31 may be accommodated in the lamp chamber in one housing.

In the above embodiment, the specific light distribution pattern P2 having the first region A1, the second region A2, and the third region A3 has been described as an example. However, the specific light distribution pattern P2 may have a first region in which at least a part becomes the first side region SA1 in the light distribution pattern PL of the low beam and a second region in which at least a part becomes the second side region in the light distribution pattern PL of the low beam. In the above embodiment, one side is the right side and the other side is the left side. However, in a country or an area where right-side traffic of vehicles is operated, one side is the left side and the other side is the right side.

In the above embodiment, when the state is changed from the first state to the second state, the positions of the left edge E1, the right edge E2, and the lower edge E3 of the predetermined region CA are not changed. However, it is sufficient that the fixed region 61 is located in the predetermined region CA in the second state. Therefore, for example, when changing from the first state to the second state, the positions of the left edge E1, the right edge E2, and the lower edge E3 may change.

Figure 21A:
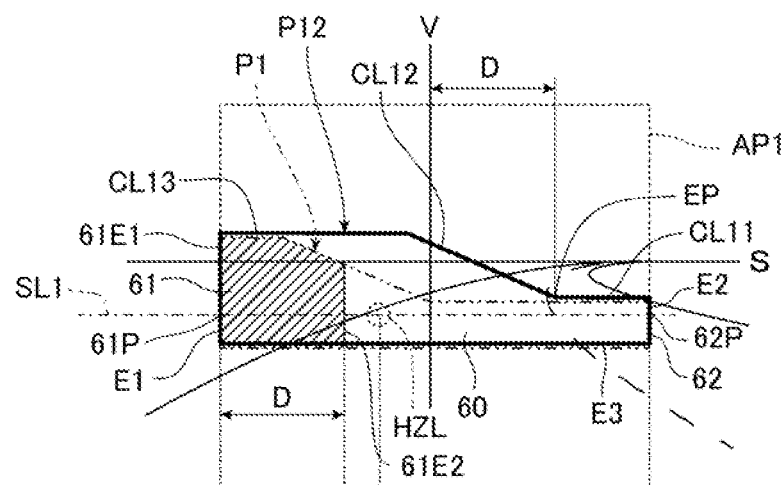
FIG. 21A is a diagram illustrating a predetermined light distribution pattern of light emitted from a first lamp unit according to a fourth modification and, FIG. 21B is a diagram illustrating an intensity distribution of light in the light distribution pattern, by a method similar to that in FIG. 16A and FIG. 16B.
Figure 21B:
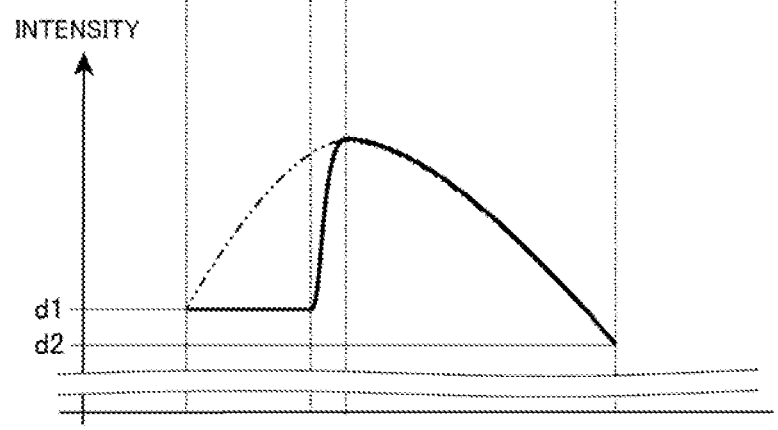

In the above embodiment, when the state is changed from the first state to the second state, the positions of the elbow point EP and the hot zone HZL are moved by the predetermined distance D to the predetermined side in the left-right direction. However, from the viewpoint of improving the visibility in the traveling direction when the traveling direction changes, the elbow point EP may move to a predetermined side in the left-right direction by a predetermined distance D. For example, the moving distance of the hot zone HZL may be smaller than the moving distance of the elbow point EP. Further, as in the modification illustrated in FIG. 21A and FIG. 21B, the elbow point EP may move without moving the hot zone HZL. That is, the control unit CO may adjust the light amount of the light emitted from the plurality of light emitting elements 13 to change the predetermined light distribution pattern P1 to a light distribution pattern in which the elbow point EP moves to the predetermined side by a predetermined distance and the hot zone HZL does not move. FIG. 21A is a diagram illustrating a predetermined light distribution pattern of light emitted from a first lamp unit according to a fourth modification, and FIG. 21B is a diagram illustrating an intensity distribution of light in the light distribution pattern, by a method similar to that in FIG. 16A and FIG. 16B. Note that the same or equivalent components as those of the second embodiment are denoted by the same reference numerals, and redundant description will be omitted unless otherwise specified.

In the present modification, as described above, the hot zone HZL does not move according to the steering angle of the vehicle 100. Therefore, as illustrated in FIG. 21B, the light intensity distribution in the predetermined light distribution pattern P12 in the present modification is different from the light intensity distribution in the predetermined light distribution pattern P12 in the second embodiment. Note that the outer shape and the position of the elbow point EP in the predetermined light distribution pattern P12 of the present modification are the same as those of the second embodiment. In the present modification, the light intensity distribution in the region overlapping the predetermined light distribution pattern P1 and on the right side of the hot zone HZL in the predetermined light distribution pattern P12 is substantially the same as the light intensity distribution in the first state before the elbow point EP moves. Therefore, the light amount of the light emitted from the light emitting element 13 that irradiates the region overlapping the predetermined light distribution pattern P12 with light does not change according to the steering angle of the vehicle 100.

Further, in the present modification, similarly to the second embodiment, the intensity of the light from the first lamp unit 10 in the second state at an arbitrary point in the fixed region 61 is the same as the intensity of the light from the first lamp unit 10 in the first state at the intersection of the straight line passing through the arbitrary point and extending in the left-right direction and the left edge 61E1 of the fixed region 61. Therefore, according to the vehicle headlight 1 of the present modification, as in the second embodiment, it is possible to prevent the driver from feeling uncomfortable when the elbow point is moved. From the viewpoint of preventing the driver from feeling uncomfortable, it is preferable to move the hot zone HZL to the predetermined side by the predetermined distance D together with the elbow point EP as in the first and second embodiments.

In addition, according to the vehicle headlight 1 of the present modification, similarly to the second embodiment, the intensity of the light from the first lamp unit 10 in the second state in the fixed region 61 is constant in the left-right direction, and it is possible to simplify the adjustment of the light amount of the light emitted from the plurality of light emitting elements 13 by the control unit CO. From the viewpoint of preventing the driver from feeling uncomfortable, the intensity of the light from the first lamp unit 10 in the second state at an arbitrary point in the fixed region 61 may be equal to or less than the intensity of the light from the first lamp unit 10 in the first state at this arbitrary point, and may be equal to or more than the intensity of the light from the first lamp unit 10 in the first state at the intersection of the straight line passing through this arbitrary point and extending in the left-right direction and the left edge 61E1 of the fixed region 61.

According to the present invention, there is provided a vehicle headlight capable of finely adjusting an intensity distribution of light in a predetermined region including an elbow point in a light distribution pattern of a low beam and reducing a manufacturing cost, and the vehicle headlight can be used in the field of vehicle headlights such as automobiles.

The invention claimed is:
1. A vehicle headlight comprising:
a first lamp unit that includes a light distribution pattern forming unit in which a plurality of light emitting units capable of individually changing a light amount of light to be emitted is arranged in a matrix including a plurality of rows and a plurality of columns and which forms a predetermined light distribution pattern according to the light amount of the light emitted from the plurality of light emitting units; and
a second lamp unit that emits light having a specific light distribution pattern,
wherein a light distribution pattern of a low beam including a horizontal cutoff line extending in a horizontal direction from an elbow point to one side in a left-right direction and an inclined cutoff line extending obliquely upward from the elbow point to the other side in the left-right direction is formed by light emitted from the first lamp unit and light emitted from the second lamp unit, and
in the light distribution pattern of the low beam, the elbow point is included in an upper edge of a predetermined region formed by light including the light from the first lamp unit, and a first side region and a second side region sandwiching the predetermined region in the left-right direction are formed by the light emitted from the second lamp unit.
2. The vehicle headlight according to claim 1,
wherein at least a part of the predetermined light distribution pattern and a part of the specific light distribution pattern overlap each other.
3. The vehicle headlight according to claim 1,
wherein at least a part of an upper edge in the first side region is located above the horizontal cutoff line.
4. The vehicle headlight according to claim 1,
wherein at least a part of an upper edge in the second side region is located above the horizontal cutoff line.
5. The vehicle headlight according to claim 1,
wherein the specific light distribution pattern includes a first region in which at least a part becomes the first side region in the light distribution pattern of the low beam, and a second region which is separated from the first region and in which at least a part becomes the second side region in the light distribution pattern of the low beam.

6. The vehicle headlight according to claim 5,
wherein the specific light distribution pattern further includes a third region located between the first region and the second region and connected to the first region and the second region, and
an upper edge in the third region is located below upper edges of the first region and the second region.

7. The vehicle headlight according to claim 6,
wherein an upper edge on the third region side in the first region is inclined downward toward the third region side and is connected to the upper edge in the third region,
an upper edge in the third region extends linearly in a horizontal direction, and
an upper edge on the third region side in the second region is inclined downward toward the third region side and is connected to the upper edge in the third region.

8. The vehicle headlight according to claim 1,
wherein a part of the predetermined light distribution pattern and a part of the specific light distribution pattern overlap each other, and
a part of the upper edge in the specific light distribution pattern extends linearly in the horizontal direction to cross the predetermined light distribution pattern.

9. The vehicle headlight according to claim 1,
wherein the second lamp unit includes a light source unit that emits light and a shade that blocks a part of the light emitted from the light source unit.

10. The vehicle headlight according to claim 1, further comprising a third lamp unit that emits light,
wherein a light distribution pattern of a high beam is formed by the light emitted from the first lamp unit, the light emitted from the second lamp unit, and the light emitted from the third lamp unit.

11. The vehicle headlight according to claim 1, further comprising a control unit,
wherein the control unit adjusts the light amount of the light emitted from the plurality of light emitting units to change the predetermined light distribution pattern to a light distribution pattern in which the elbow point moves to a predetermined side in the left-right direction by a predetermined distance,
a fixed region coinciding with a range from an edge on a side opposite to the predetermined side to a position away from the predetermined side by the predetermined distance in the predetermined region in a first state before the elbow point moves is located in the predetermined region in a second state after the elbow point moves, and
an intensity of the light from the first lamp unit in the second state at an arbitrary point in the fixed region is equal to or less than an intensity of light from the first lamp unit in the first state at the arbitrary point and equal to or more than an intensity of light from the first lamp unit in the first state at an intersection of a straight line passing through the arbitrary point and extending in the left-right direction and an edge of the fixed region on a side opposite to the predetermined side.

12. The vehicle headlight according to claim 11,
wherein the intensity of the light from the first lamp unit in the second state at the arbitrary point is the same as the intensity of the light from the first lamp unit in the first state at the intersection of the straight line passing through the arbitrary point and extending in the left-right direction and the edge of the fixed region on the side opposite to the predetermined side.

13. The vehicle headlight according to claim 11,
wherein the predetermined region includes a hot zone, and
the hot zone moves together with the elbow point to the predetermined side by the predetermined distance.

14. The vehicle headlight according to claim 13,
wherein the intensity of the light from the first lamp unit in the second state gradually increases from the edge on the predetermined side of the fixed region toward the hot zone.

15. The vehicle headlight according to claim 13,
wherein the intensity of the light from the first lamp unit in the second state gradually increases from the edge of the fixed region on the side opposite to the predetermined side toward the hot zone.

16. The vehicle headlight according to claim 11,
wherein an edge on the predetermined side of the predetermined region in the first state is located in the predetermined region in the second state, and an intensity of light from the first lamp unit in the second state at an arbitrary reference point on a reference line coinciding with the edge on the predetermined side of the predetermined region in the first state is equal to or more than an intensity of light from the first lamp unit in the first state at the arbitrary reference point and equal to or less than an intensity of light from the first lamp unit at the arbitrary reference point when the predetermined light distribution pattern in the first state moves to the predetermined side by the predetermined distance.

17. The vehicle headlight according to claim 16,
wherein the intensity of the light from the first lamp unit in the second state at the arbitrary reference point is the same as the intensity of the light from the first lamp unit in the first state at the arbitrary reference point.

18. The vehicle headlight according to claim 16,
wherein the predetermined region includes a hot zone, the hot zone moves together with the elbow point to the predetermined side by the predetermined distance, and the intensity of the light from the first lamp unit in the second state gradually increases from the reference line toward the hot zone.

* * * * *